US008811373B2

(12) United States Patent
Malladi et al.

(10) Patent No.: US 8,811,373 B2
(45) Date of Patent: Aug. 19, 2014

(54) RATE MATCHING OF MESSAGES CONTAINING SYSTEM PARAMETERS

(75) Inventors: Durga Malladi, San Diego, CA (US); Juan Montojo, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 1056 days.

(21) Appl. No.: 12/191,003

(22) Filed: Aug. 13, 2008

(65) Prior Publication Data

US 2009/0046672 A1 Feb. 19, 2009

Related U.S. Application Data

(60) Provisional application No. 60/956,110, filed on Aug. 15, 2007.

(51) Int. Cl.
*H04J 3/06* (2006.01)

(52) U.S. Cl.
USPC ........... 370/350; 370/504; 370/506; 370/509; 370/520

(58) Field of Classification Search
USPC .................................. 370/235, 470, 473, 476
See application file for complete search history.

(56) References Cited

U.S. PATENT DOCUMENTS 7,031,295 B2 4/2006 Schafer
7,349,371 B2 3/2008 Schein et al.
2001/0055271 A1* 12/2001 Okada et al. .................. 370/206
2003/0147358 A1* 8/2003 Hiramatsu et al. ............ 370/281
2004/0082356 A1 4/2004 Walton et al.
2006/0050677 A1 3/2006 Schafer
2006/0221809 A1* 10/2006 Malladi et al. ................ 370/206
2006/0285517 A1* 12/2006 Kakani ......................... 370/329
2007/0159957 A1* 7/2007 Ljung et al. ................... 370/208
2007/0274203 A1* 11/2007 Kimura et al. ................ 370/208

FOREIGN PATENT DOCUMENTS

CN 1497881 A 5/2004
CN 101005329 A 7/2007
WO WO2008063242 5/2008

OTHER PUBLICATIONS

International Search Report & Written Opinion—PCT/US2008/073323, International Search Authority—European Patent Office—Dec. 22, 2008.
Taiwan Search Report—TW097131376—TIPO—Apr. 16, 2012.

* cited by examiner

*Primary Examiner* — Alvin Zhu
(74) *Attorney, Agent, or Firm* — Dalei Dong

(57) ABSTRACT

Systems, methodologies, and devices are described that facilitate transmitting a guard time parameter to a mobile device to facilitate rate matching data around a guard time region associated with a downlink subframe of a radio frame sequence. A base station transmits the guard time parameter via PBCH or DBCH to the mobile device. The base station rate matches data associated with PDSCH, comprising DBCH, around the guard time region, and transmits PDSCH to the mobile device. The mobile device identifies the guard time parameter and rate matches at least a portion of the information received via the PDSCH around the guard time region to facilitate enhanced reception of PDSCH. Optionally, a radio frame sequence can be structured so that a subframe immediately following a subframe containing DBCH is a downlink subframe, which can be known by the mobile device a priori or based on a downlink subframe parameter.

32 Claims, 19 Drawing Sheets

800

RECEIVE DATA COMPRISING A GUARD TIME PARAMETER — 802

RATE MATCH AT LEAST A PORTION OF THE RECEIVED DATA BASED AT LEAST IN PART ON THE GUARD TIME PARAMETER — 804

RATE MATCHING OF MESSAGES CONTAINING SYSTEM PARAMETERS

CROSS-REFERENCE TO RELATED APPLICATIONS

This application claims the benefit of U.S. Provisional Patent application Ser. No. 60/956,110 entitled "RATE MATCHING OF MESSAGES CONTAINING SYSTEM PARAMETERS IN TDD SYSTEMS" which was filed Aug. 15, 2007, the entirety of the aforementioned application is herein incorporated by reference.

BACKGROUND

I. Field

The following description relates generally to wireless communications, and more particularly to rate matching of messages containing system parameters in time division duplex (TDD) systems.

II. Background

Wireless communication systems are widely deployed to provide various types of communication; for instance, voice and/or data can be provided via such wireless communication systems. A typical wireless communication system, or network, can provide multiple users access to one or more shared resources (e.g., bandwidth, transmit power, . . . ). For instance, a system can use a variety of multiple access techniques such as Frequency Division Multiplexing (FDM), Time Division Multiplexing (TDM), Code Division Multiplexing (CDM), Third Generation Partnership Project (3GPP) Long-Term Evolution (LTE) systems, Orthogonal Frequency Division Multiplexing (OFDM), and others.

Generally, wireless multiple-access communication systems can simultaneously support communication for multiple mobile devices. Each mobile device can communicate with one or more base stations via transmissions on forward and reverse links. The forward link (or downlink) refers to the communication link from base stations to mobile devices, and the reverse link (or uplink) refers to the communication link from mobile devices to base stations. This communication link can be established via a single-input-single-output (SISO), multiple-input-single-output (MISO), single-input-multiple-output (SIMO), or a multiple-input-multiple-output (MIMO) system.

For instance, a MIMO system can employ multiple ($N_T$) transmit antennas and multiple ($N_R$) receive antennas for data transmission. A MIMO channel formed by the $N_T$ transmit and $N_R$ receive antennas can be decomposed into $N_S$ independent channels, which are also referred to as spatial channels, where $N_S \leq \min\{N_T, N_R\}$ Each of the $N_S$ independent channels can correspond to a dimension. The MIMO system can provide improved performance (e.g., higher throughput and/or greater reliability) if the additional dimensionalities created by the multiple transmit and receive antennas are utilized.

A MIMO system can support a time division duplex (TDD) and frequency division duplex (FDD) systems. In a TDD system, the forward and reverse link transmissions can be on the same frequency region so that the reciprocity principle allows the estimation of the forward link channel from the reverse link channel. This can enable the access point to extract transmit beamforming gain on the forward link when multiple antennas are available at the access point Wireless communication systems oftentimes employ one or more base stations that provide a coverage area. A typical base station can transmit multiple data streams for broadcast, multicast and/or unicast services, wherein a data stream may be a stream of data that can be of independent reception interest to a mobile device. A mobile device within the coverage area of such base station can be employed to receive one, more than one, or all the data streams carried by the composite stream. Likewise, a mobile device can transmit data to the base station or another mobile device.

Typically, when communication is being established between a mobile device and a base station, the mobile device has limited information regarding the base station. During initial communication between the mobile device and base station, the base station can transmit certain messages, such as system parameter messages, via primary broadcast channel (PBCH) and physical downlink shared channel (PDSCH), which can comprise dynamic broadcast channel (DBCH), to the mobile device, where the PBCH and DBCH each can contain respective portions of the system parameters associated with the wireless system, in general, and with the base station, in particular, to facilitate communication with the mobile device.

To facilitate communication, the communication system can employ radio frames that can comprise subframes, which can be designated for downlink or uplink transmission of data between the base station and mobile device. Typically, a subframe can comprise two slots. A specified number of symbols (e.g., encoded data, such as system parameter information) can be contained in the slots of a subframe. However, during downlink transmission of DBCH, in a frame sequence where an uplink subframe immediately follows a subframe containing the DBCH, a portion of the resource elements (e.g., associated with a corresponding symbol and sub-carrier) at the end of the second slot is typically allocated as guard time, which is related to downlink to uplink switching time, to enable the mobile device time advance its uplink transmission. As a result, data (e.g., symbols) associated with the PDSCH, including DBCH, that appears in this guard time region can be omitted, erased, or otherwise eliminated. This results in inefficiency for the mobile device attempting to acquire the base station, as one parameter the mobile device typically will not know in advance is the guard time employed by the base station, and the guard time can vary. Further, allocation of an uplink subframe may not always immediately follow a subframe containing the DBCH.

It is desirable to reduce or eliminate inefficiency related to data, which can be DBCH and/or other information associated with the PDSCH, in the guard time region being omitted, erased, or otherwise eliminated, so that the mobile device can more efficiently acquire and establish communication with the base station. By reducing or eliminating omission, erasure, or elimination of data, such as DBCH, the mobile device can more efficiently receive the system parameters associated with the base station and can be configured more efficiently to optimize communication between the mobile device and base station.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with transmitting a guard time parameter related to a guard time region of a radio frame sequence to a mobile device to facilitate rate matching data around unoccupied symbols of the guard time region. In accordance with various embodiments, a base station, which is communicatively connected to a mobile device, can transmit the guard time parameter via a primary broadcast channel (PBCH) or a dynamic broadcast channel (DBCH) to the mobile device. In an aspect, the base station can rate match a subset of information around the guard time region, wherein the subset of information can include at least a portion of the system parameters and other information associated with a physical downlink shared channel (PDSCH), comprising the DBCH. The base station can transmit the rate matched information via the PDSCH to the mobile device. In an aspect, the mobile device can identify the guard time parameter, whether received via the PBCH or DBCH (e.g., the DBCH received via the PDSCH), and can determine a proper rate match to employ on received information based at least in part on the guard time parameter. The mobile device can rate match received information (e.g., information received via PDSCH) around the guard time region to facilitate enhanced reception of PDSCH by the mobile device.

In accordance with various other embodiments, to facilitate improved reception of the PDSCH and/or other information, a radio frame sequence can be structured so that a subframe that immediately follows a subframe containing DBCH can be designated as a downlink subframe. In one embodiment, the base station can transmit a subset of information, comprising a downlink subframe parameter (and the guard time parameter), via the DBCH, which can be mapped to the PDSCH and transmitted to the mobile device via the PDSCH. In an embodiment, the mobile device can identify the downlink subframe parameter and can be configured to operate in accordance with the radio frame sequence based at least in part on the downlink subframe parameter. In accordance with another embodiment, an inherent property of the architecture of the communication system can comprise a radio frame sequence that is structured so that a subframe that immediately follows a subframe containing DBCH is designated as a downlink subframe, and the mobile device can have knowledge a priori of the structure of the radio frame sequence. The mobile device can rate match at least a portion of the information received via the PDSCH to facilitate improved reception of PDSCH by the mobile device.

According to related aspects, a method that facilitates communication associated with a mobile device is described herein. The method can include erasing a portion of a subset of data associated with a physical downlink shared channel that is contained in a guard time region. Further, the method can comprise transmitting the subset of data, comprising a portion of system parameters including a guard time parameter, to a plurality of mobile devices, including the mobile device, wherein the guard time parameter is based at least in part on the guard time region and facilitates rate matching of data by the mobile device.

Another aspect relates to a wireless communications apparatus. The wireless communications apparatus can include a memory that retains instructions related to erase a portion of a subset of data associated with a physical downlink shared channel that is contained in a guard time region, and transmission of the subset of data, comprising a portion of system parameters including a guard time parameter, via one of a primary broadcast channel or dynamic broadcast channel, wherein the guard time parameter is based at least in part on the guard time region and facilitates rate matching of data by the mobile device. Further, the wireless communications apparatus can include a processor, coupled to the memory, configured to execute the instructions retained in the memory.

Yet another aspect relates to a wireless communications apparatus that facilitates communication associated with a mobile device. The wireless communications apparatus can include means for erasing a portion of a subset of data associated with a physical downlink shared channel that is contained in a guard time interval. Further, the wireless communications apparatus can comprise means for transmitting the subset of data, comprising a portion of system parameters including the guard time parameter, wherein the guard time parameter relates to the guard time interval and facilitates rate matching of data by the mobile device.

Still another aspect relates to a computer program product, comprising: a computer-readable medium comprising code for: erasing a portion of a subset of data associated with a physical downlink shared channel that is contained in a guard time region; and communicating the subset of data, comprising a portion of system parameters including a guard time parameter, wherein the guard time parameter is based at least in part on the guard time region and facilitates rate matching of data by the mobile device.

In accordance with another aspect, an apparatus in a wireless communication system can include a processor, wherein the processor can be configured to erase a portion of a subset of data associated with a physical downlink shared channel that is contained in a guard time region. Moreover, the processor can be configured to transmit the subset of data, comprising a portion of system parameters including a guard time parameter, wherein the guard time parameter is based at least in part on the guard time region and facilitates rate matching of data by the mobile device.

According to other aspects, a method that facilitates communication associated with a mobile device is described herein. The method can include receiving data comprising a guard time parameter related to a guard time region associated with a downlink subframe of a radio frame sequence. Further, the method can comprise rate matching at least a portion of the received data based at least in part on the guard time parameter to facilitate improved reception of a physical downlink shared channel.

Yet another aspect relates to a wireless communications apparatus that can include a memory that retains instructions related to reception of data comprising a guard time parameter related to a guard time region associated with a downlink subframe of a radio frame sequence, and rate match of at least a portion of the received data based at least in part on the guard time parameter to facilitate improved reception of a physical downlink shared channel. Further, the wireless communications apparatus can comprise a processor, coupled to the memory, configured to execute the instructions retained in the memory.

Another aspect relates to a wireless communications apparatus that facilitates communication associated with a mobile device. The wireless communications apparatus can include means for receiving data, comprising a guard time parameter related to a guard time region associated with a downlink subframe of a radio frame sequence, via at least one of a primary broadcast channel or a dynamic broadcast channel. Further, the wireless communications apparatus can include means for rate matching at least a portion of the received data based at least in part on the guard time parameter to facilitate improved reception of a physical downlink shared channel.

Still another aspect relates to a computer program product, comprising: a computer-readable medium comprising code for: receiving data comprising a guard time parameter related to a guard time region associated with a downlink subframe of a radio frame sequence; and rate matching at least a portion of the received data around the guard time region based at least in part on the guard time parameter to facilitate improved reception of a physical downlink shared channel.

In accordance with another aspect, an apparatus in a wireless communication system can include a processor, wherein the processor can be configured to receive data, comprising a guard time parameter related to a guard time region associated with a downlink subframe of a radio frame sequence, via at least one of a primary broadcast channel or a dynamic broadcast channel. Further, the processor can be configured to rate match at least a portion of the received data based at least in part on the guard time parameter to facilitate improved reception of a physical downlink shared channel To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments can be employed and the described embodiments are intended to include all such aspects and their equivalents.

DETAILED DESCRIPTION

Figure 1:
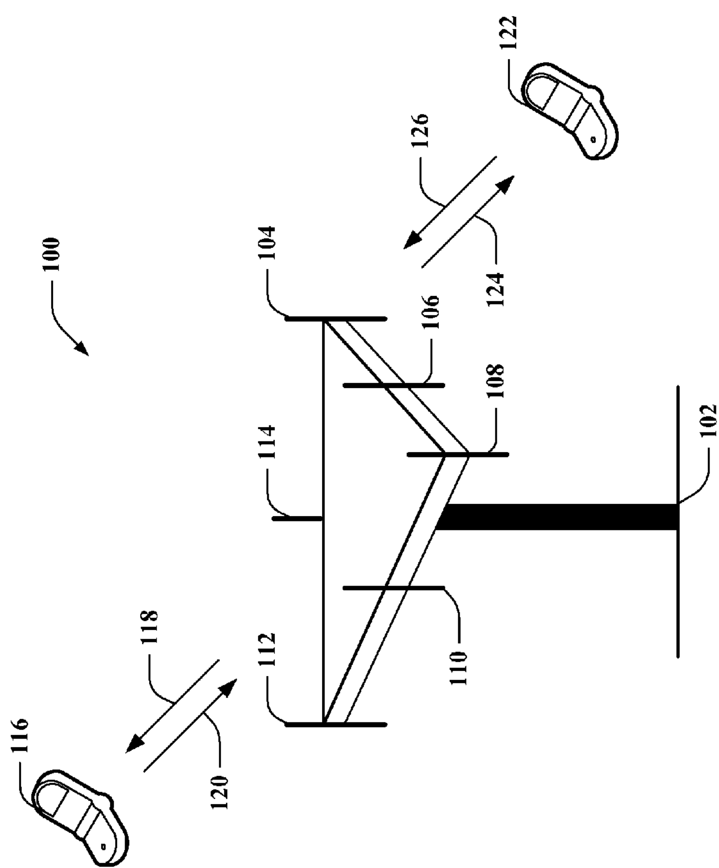
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "module," "system," "detector," "encoder," "decoder," "evaluator," "rate matcher," "frame sequence configurator," "system parameter indicator," "message generator," "mapper", "data store," and the like can refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), CDMA2000, etc. UTRA includes Wideband-CDMA (W-CDMA) and other variants of CDMA. CDMA2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMÒ, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). CDMA2000 and UMB are described in documents from an organization named "3rd Generation Partnership Project 2" (3GPP2). These various radio technologies and standards are known in the art.

Furthermore, various embodiments are described herein in connection with a mobile device. A mobile device can also be called a system, subscriber unit, subscriber station, mobile station, mobile, remote station, remote terminal, access terminal, user terminal, terminal, wireless communication device, user agent, user device, or user equipment (UE). A mobile device can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with mobile device(s) and can also be referred to as an access point, Node B (e.g., evolved Node B, eNode B, eNB), or some other terminology.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

FIG. 1 illustrates a wireless communication system 100 in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more mobile devices such as mobile device 116 and mobile device 122; however, it is to be appreciated that base station 102 can communicate with substantially any number of mobile devices similar to mobile devices 116 and 122. Mobile devices 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, mobile device 116 is in communication with antennas 112 and 114, where antennas 112 and 114 transmit information to mobile device 116 over a forward link 118 (e.g., downlink (DL)) and receive information from mobile device 116 over a reverse link 120 (e.g., uplink (UL)). Moreover, mobile device 122 is in communication with antennas 104 and 106, where antennas 104 and 106 transmit information to mobile device 122 over a forward link 124 and receive information from mobile device 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to mobile devices (e.g., 116) in a sector of the areas covered by base station 102. In communication over forward links 118 and 124, the transmitting antennas of base station 102 can utilize beamforming to improve signal-to-noise ratio of forward links 118 and 124 for mobile devices 116 and 122. Also, while base station 102 utilizes beamforming to transmit to mobile devices 116 and 122 scattered randomly through an associated coverage, mobile devices in neighboring cells can be subject to less interference as compared to a base station transmitting through a single antenna to all its mobile devices.

Typically, when communication is being established between a mobile device and a base station (e.g., mobile device is attempting to acquire the communication system), the mobile device has limited information regarding the base station. When the mobile device is attempting to acquire the base station, the base station can transmit certain messages via primary broadcast channel (PBCH) and dynamic broadcast channel (DBCH), which can be mapped to a physical downlink shared channel (PDSCH), to the mobile device, to facilitate establishing optimal communication between the base station and mobile device. For instance, a system parameter message comprising a portion of the system parameters associated with the base station can be transmitted via the PBCH to the mobile device, and another system message comprising another portion of the system parameters can be transmitted via the DBCH, which can be mapped to the PDSCH, to the mobile device to facilitate configuring the mobile device to facilitate communication between the mobile device and base station.

For data transmission, radio frames can be employed, where a radio frame can comprise a specified number of subframes, which can be designated for DL or UL transmission of data between the base station and mobile device. Typically, a subframe can comprise two slots, where a specified number of resource elements can be contained in each slot. Each resource element can be associated with a corresponding symbol (e.g., encoded data, such as system parameter information).

However, during DL transmission of DBCH, in a frame sequence where an UL subframe immediately follows a subframe containing the DBCH, a portion of the resource elements (e.g., associated with a corresponding symbol and sub-carrier) at the end of the second slot is typically allocated as guard time to enable the mobile device time advance its uplink transmission. As a result, data (e.g., symbols), which can include information associated with the PDSCH, that appears in this guard time region can be omitted, erased, or otherwise eliminated. This results in inefficiency for the mobile device attempting to acquire the base station, as the mobile device typically will not know the guard time parameter employed by the base station in advance, and the guard time can vary. Further, allocation of an UL subframe may not always immediately follow a subframe containing the DBCH.

It is desirable to reduce or eliminate inefficiency related to data, such as information associated with the PDSCH, by reducing or eliminating omission, erasure, or elimination of such data, so that the mobile device can more efficiently acquire and establish communication with the base station. By reducing or eliminating omission, erasure, or elimination of such data, the mobile device can more efficiently receive the system parameters associated with the base station, and the mobile device can be configured more efficiently to optimize communication between the mobile device and base station.

In accordance with various embodiments and aspects, the subject innovation can facilitate efficient transmission of the guard time parameter associated with a DL subframe via PBCH or DBCH to a mobile device (e.g., 116) when the mobile device 116 is establishing communication with the base station 102 and/or can configure a radio frame sequence so that a subframe that follows a subframe containing DBCH can be designated as a DL subframe. The base station 102 can rate match data, such as information contained in the PDSCH, being transmitted to the mobile device 116, based at least in part on the guard time, so that the data does not occupy the guard time region of the subframe. The mobile device 116 can discover the guard time parameter in a received message and can utilize the guard time parameter to determine a proper rate match. Based at least in part on the determined rate match, the mobile device 116 can rate match received data, such as at least a portion of the information contained in the PDSCH (e.g., portion of the system parameters). As a result, omission, erasure, or elimination of data due to the guard time interval can be reduced or eliminated.

Figure 2:
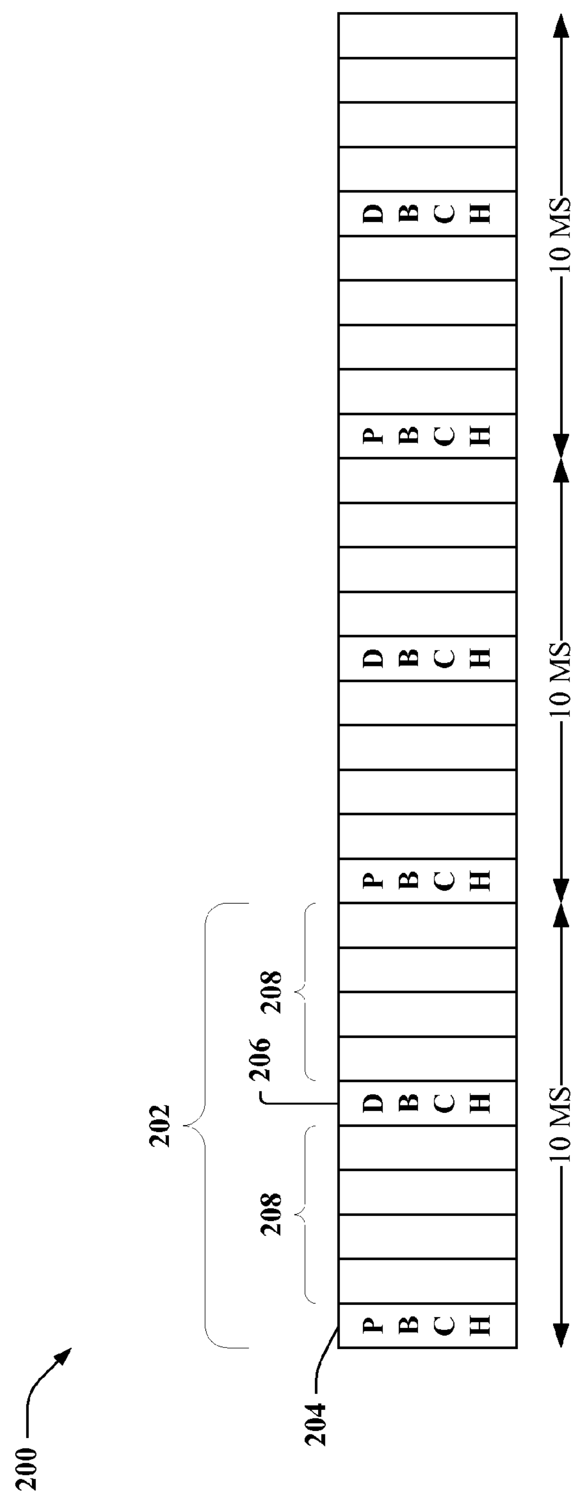
FIG. 2 depicts an example radio frame sequence in accordance with one embodiment of the disclosed subject matter.

Turning briefly to FIG. 2, depicted is an example radio frame sequence 200 in accordance with one embodiment of the disclosed subject matter. Radio frame sequence 200 can comprise a plurality of radio frames 202. In accordance with the example embodiment, radio frame 202 can be 10 milliseconds (ms) long, and can further be sub-divided into a plurality of subframes (e.g., 10 subframes), wherein each subframe can be 1 ms. The sub-division of frame 202 also can be viewed in terms of sub-dividing radio frame 202 into a plurality of slots (e.g., 20 slots), wherein each slot can be 0.5 ms, where each subframe can comprise two consecutive slots.

Radio resources in radio frame 202 can be allocated for DL or UL transmission, as desired. In one aspect, subframe 204 can be designated for DL transmission of a system parameter message(s), which can comprise at least a portion of the system parameters, via the PBCH, and subframe 206 can be designated for DL transmission of other system parameter message(s), which can comprise at least another portion of the system parameters, via the DBCH. The various system parameter messages can be communicated to one of more mobile devices (e.g., 116, 122) operating in the wireless communication system. It is to be appreciated and understood that the specific time allocation for PBCH and DBCH, as shown in FIG. 2, is only exemplary, different time allocations for PBCH and DBCH can be utilized in accordance with various other embodiments of the disclosed subject matter. In accordance with an aspect, separating system parameter messages into more than one portion (e.g., using PBCH and DBCH) can facilitate providing greater implementation flexibility.

In one aspect, the system parameters provided by the PBCH and/or DBCH can contain, for example, various physical layer parameters. For instance, upon decoding the PBCH, the mobile device 116 generally has at least primitive system information, such as, for example, frame boundary (e.g., 10 ms in the example of FIG. 3), PBCH timing boundary (e.g., 40 ms), and/or system bandwidth. For example, the PBCH can provide one or more of the following parameters: DL system bandwidth; number of transmits antennas, multimedia/multicast single frequency network (MBFSN) related parameters; reference-signal transmit power; system frame number (SFN); scheduling information of the most frequently repeated scheduling unit (SU-1); value tag(s); control format indicator (CFI) signaling; and/or other parameters.

By way of further example, the DBCH can provide another portion of the system parameters, such as scheduling and/or other parameters, to the mobile device 116, such as follows: random access channel (RACH) parameters; MIMO/precoding parameters; TDD configuration (e.g., subframe allocation for DL and/or UL); one or more public land mobile network (PLMN) identities; tracking area code, cell identity; cell barring information; "cell reserved for operator use" information (e.g., 1 bit of information) per sharing PLMN (e.g., up to 6); "cell reservation extension" information (e.g., 1 bit of information) that can be common for all sharing PLMNs; scheduling information (e.g., the periodicity of the other scheduling units, such as scheduling units other than SU-1); system information block (SIB) mapping information (e.g., indication in which SU the SIB is included); and/or other parameters.

In accordance with another aspect, the radio frame 202 can further include one or more additional subframes 208. The one or more additional subframes 208 can be allocated for transmission of DL data or UL data, as desired.

Figure 3:
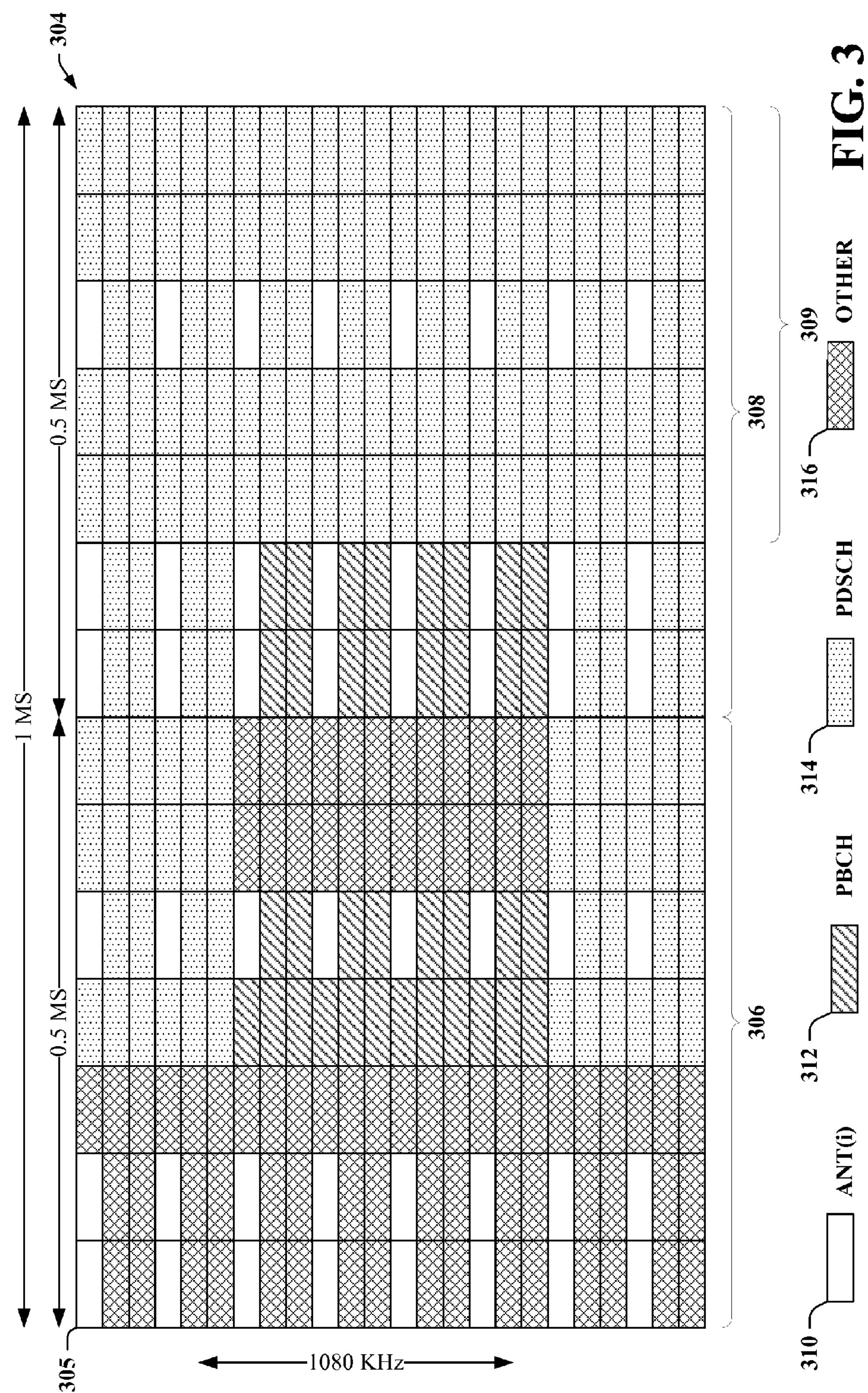
FIG. 3 illustrates a block diagram of an exemplary downlink subframe according to an embodiment of the disclosed subject matter.

Referring to FIG. 3, illustrated is a block diagram of an exemplary downlink subframe 304 according to an embodiment of the disclosed subject matter. In one aspect, the subframe 304 can be 1 ms and can comprise slot 306 and slot 308 that can each be 0.5 ms in length. In subframe 304, the vertical dimension of each slot 306, 308 can correspond to the frequency of the radio resource, which can be 1080 Kilohertz (KHz) in accordance with the example of FIG. 3, and can be subdivided into a plurality of sub-carriers. In an aspect, each DL slot (e.g., 306, 308) can further comprise a plurality of symbols (e.g., OFDM symbols), which can be a predetermined number of symbols (e.g., 7 symbols as shown in FIG. 3). For example, where a longer cyclic prefix (CP) is appended to a symbol as a guard time, the number of symbols can be less (e.g., 6 symbols or less). In another aspect, the DL subframe 304 can be represented by a grid of resource elements 305, wherein each resource element 305 can be associated with a corresponding symbol and sub-carrier. In accordance with an aspect, there can be one or more resource elements 310 that can be allocated for transmitting DL reference signals for various antennas in the wireless communications system; one or more resource elements 312 that can be allocated for PBCH; one or more resource elements 314 that can be allocated to for physical downlink shared channel (PDSCH); and/or one or more resource elements 316 that can be allocated for other channels, such as PSC, SSC, Physical Hybrid ARQ channel (PHICH), and/or Physical Downlink Control Channel (PDCCH), for example.

In an aspect, the DBCH can include at least a portion of the system parameters that can be transmitted to a mobile device (e.g., 116), and can be mapped to the resource elements associated with the PDSCH. As depicted in FIG. 3, at least a portion of the resource elements associated with PDSCH can extend into region 309 of the subframe 304 symbol allocation. In a frame sequence where an UL subframe immediately follows a subframe containing DBCH, a portion of resource elements at the end of slot 308 (e.g., region 309), comprising a desired number of symbols, can be allocated as guard time to enable the mobile device 116 to time advance its uplink transmission. Consequently, at least a portion of the data associated with the PDSCH, including DBCH, during the guard time can be omitted, erased, and/or otherwise eliminated. As a result, there can be undesirable inefficiency for a mobile device (e.g. 116) attempting to acquire the system (e.g., base station 102) as the mobile device 116 typically does not know in advance the location of the DBCH in time, guard time can vary, and allocation of an UL subframe may not always immediately follow a subframe containing the DBCH.

Referring again to FIG. 1, in accordance with one embodiment, the guard time (e.g., the DL to UL switching time) associated with the base station 102 can be indicated as a parameter in the PBCH. For example, the PBCH can contain an additional parameter, which can be a guard time parameter, that can indicate the number of symbols related to the guard time. For instance, the guard time parameter (e.g. TDP guard time parameter) can be defined in the PBCH and can specify a predetermined number of symbols for the guard time, such as, for example, up to 3 bits long to accommodate up to 5 symbols (e.g., region 309). In one aspect, the PBCH, comprising the guard time parameter, can be transmitted to a mobile device(s) (e.g., 116) by the base station 102. In another aspect, the base station 102 can rate match data associated with DBCH, which can be mapped to the PDSCH, wherein rate matching can be based at least in part on the guard time parameter, and data can therefore be matched around the unoccupied symbols associated with the guard time region 309. The base station 102 can refrain from occupying during the guard time interval.

In accordance with another aspect, the mobile device 116 can receive the guard time parameter transmitted via the PBCH, and based at least in part on the guard time parameter, the mobile device 116 can determine a desired rate match for the received information, such as the DBCH received via the PDSCH, which can thereby improve reception of the PDSCH and communication associated with the mobile device 116. In accordance with still another aspect, other information (e.g., user data, control information, . . . ) that can be carried by the PDSCH also can be rate matched based at least in part on the guard time parameter to facilitate providing improved reception of PDSCH and communication by the mobile device 116.

Figure 4:
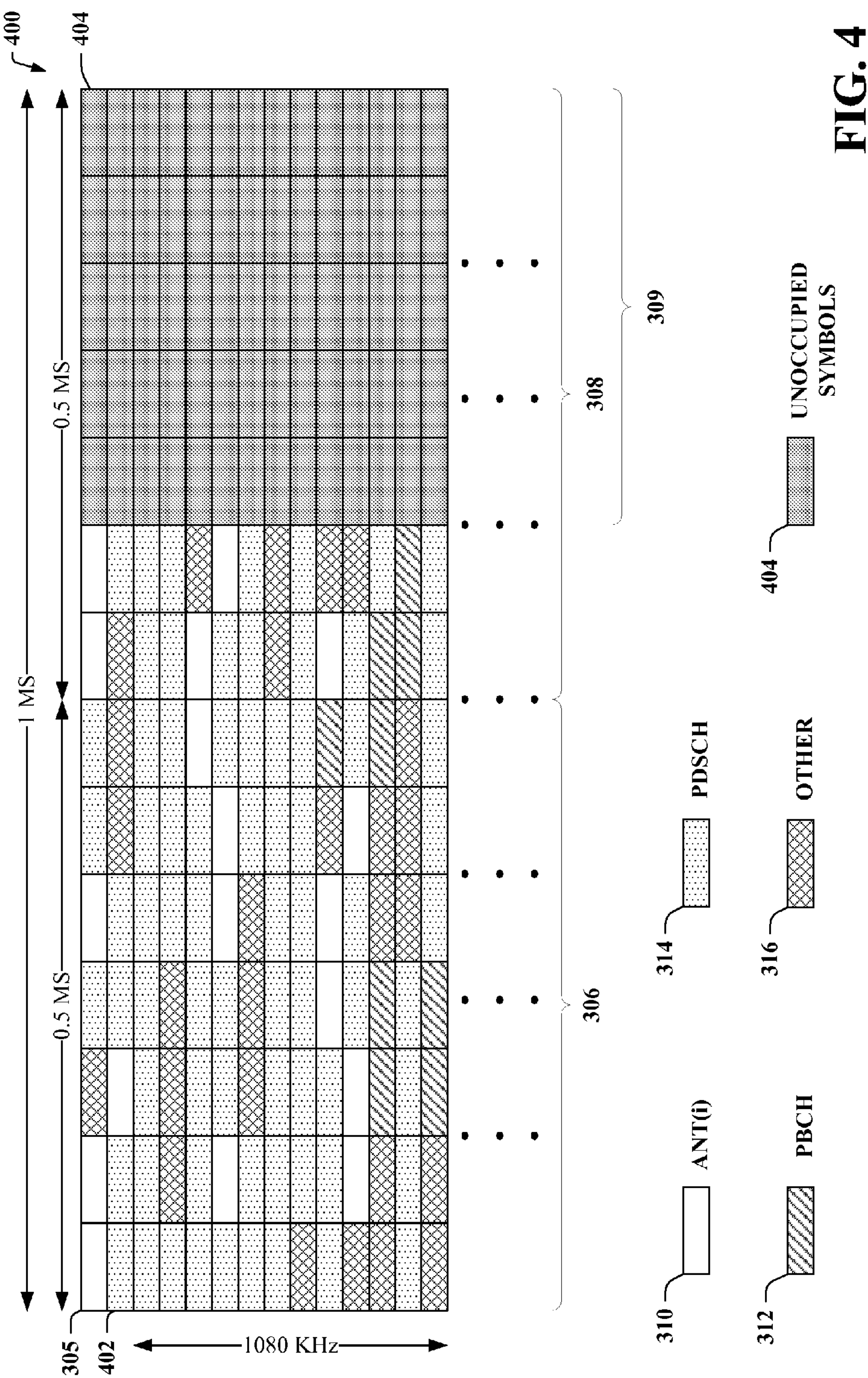
FIG. 4 depicts a block diagram of an exemplary portion of a downlink subframe with rate matching of data according to an embodiment of the disclosed subject matter.

Referring briefly to FIG. 4, depicted is a block diagram of an exemplary portion of a downlink subframe 400 with rate matching of data according to an embodiment of the disclosed subject matter. The DL subframe 400 can include subframe 304, slot 306, slot 308, region 309 (e.g., guard time region), a portion of a grid of resource elements 305, which can comprise one or more resource elements 310 that can be allocated for transmitting DL reference signals for various antennas in the wireless communications system; one or more resource elements 312 that can be allocated for PBCH; one or more resource elements 314 that can be allocated for PDSCH; and/or one or more resource elements 316 that can be allocated for other channels, such as PSC, SSC, and/or PHICH+PDCCH, for example. The subframe 304, slot 306, slot 308, region 309, resource elements 305, including resource elements 310, 312, 314, and 316, each can be the same or similar as, and/or can comprise the same or similar functionality as, respective components, items, or elements, such as more fully described herein, for example, with regard to DL subframe 300.

In one aspect, based at least in part on the guard time parameter, the base station 102 can rate match data (e.g. resource elements 310, 314, and 316), so that the data does not occupy the guard time region 309. For instance, the base station 102 can encode data to be transmitted to the mobile device 116. The base station 102 can rate match the data, based at least in part on the guard time parameter, such that symbols that would be contained in the guard time region 309 are instead rate matched around the guard time region 309, where those symbols can be placed in a new row of the grid, for example.

As an example, referring briefly to FIG. 3, the first row of resource elements 305 occupy all regions, including the guard time region 309. Conventionally, as can be seen in DL subframe 300, if the data is not rate matched, in the first row of resource elements 305, while the first three resource elements 314 (e.g., which can be allocated for PDSCH) of the first row of resource elements are positioned outside the guard region 309, the last four of the resource elements 314 and resource element 310 are positioned within the guard time region 309, and the data contained in the guard time region 309 can be erased or otherwise eliminated by the base station 102 when transmitting a message to the mobile device 116. For instance, noise can occupy the guard time region 309 in place of the erased data. This can result in inefficiency in communications between the mobile device 116 and base station 102.

Referring again to FIG. 4, the base station 102 can rate match data around the guard time region 309, so that when the guard time region 309 is reached, the next resource element 402 (e.g., resource element 314 related to PDSCH in the example DL subframe 400) can be positioned to start the next row of resource elements 305 in the grid, instead of being placed within the guard time region 309. The guard time region 309 can remain unoccupied (e.g., unoccupied symbols 404). The resource elements subsequent to resource element 402 can continue in a desired order in that row (e.g., after resource element 402 in the second row, there can be resource element 314, followed by resource element 310, another resource element 314, yet another resource element 314, etc.) until the guard time region 309 is reached for the second row, where unoccupied symbols 404 can populate the guard time region 309 of the second row, and base station 102 can populate a new row with resource elements 305 (except for the portion of the row within the guard time region 309). This pattern of populating the grid can continue until the DL subframe 400 is populated, as desired.

The data, as rate matched, can be transmitted to the mobile device 116. Based at least in part on the received guard time parameter, the mobile device 116 can rate match received data (e.g., data associated with DL subframe 400), such as, for example, data received via the PDSCH (e.g., resource elements 314). The mobile device 116 can rate match around the guard time region 309 to discover the transmitted data. The mobile device 116 (and base station 102), by rate matching around the guard time region 309 can result in improved reception of data, including data associated with the PDSCH, and can reduce, minimize, or eliminate omitting, erasing or otherwise eliminating data transmitted by the base station 102 due to the guard time interval.

Turning again to FIG. 1, transmitting the guard time parameter via PBCH to the mobile device can facilitate enabling the mobile device 116 to rate match received data. Rate matching of data (e.g. as disclosed with regard to FIG. 4), such as data associated with the PDSCH, by the mobile device 116 and base station 102 can facilitate improved reception of PDSCH and/or other information and improved communication between the mobile device 116 and base station 102.

In accordance with another embodiment, the guard time parameter associated with the guard time region 309 (e.g., guard time interval) can be identified in the DBCH, instead of the PBCH, and can be transmitted via the PDSCH by the base station 102 to mobile devices, including the mobile device 116, in the communication network. For instance, a guard time parameter can be contained in data (e.g., a portion of system parameters) transmitted via the DBCH, where the guard time parameter can specify the number of symbols allocated for the guard time interval. For example, the number of symbols for guard time can be up to three bits long to accommodate a potential guard time interval (e.g., guard time region 309) of up to five symbols. In one aspect, the base station 102 does not transmit the DBCH in the unoccupied symbols (e.g., 404) of the guard time interval, and the mobile device 116 attempts decoding of the DBCH as if there was no guard interval. Typically error correction mechanisms will compensate for the fact that some of the coded bits have been erased from their transmission due to the guard time interval and the DBCH will be correctly decoded at the mobile device 116. In still another aspect, the base station 102 can rate match other information associated with the PDSCH (e.g., additional information, such as user data, other system parameters, unicast information, and/or other information carried by the PDSCH) based at least in part on the guard time parameter (e.g., base station 102 can rate match data in a manner such as described herein with regard to FIG. 4 and DL subframe 400), where such other information can be rate matched around the unoccupied symbols associated with the guard time interval (e.g., the guard time region 309). The base station 102 can refrain from occupying the guard time interval with this other information associated with the PDSCH.

Initially, when the mobile device 116 is acquiring the base station 102, the mobile device 116 may not know the guard time interval, and, as a result, the mobile device 116 typically will not be able to rate match data in a received message, such as PDSCH. During this time, in a radio frame sequence where an UL subframe immediately follows a subframe containing DBCH, a portion of resource elements at the end of slot 308 (e.g., region 309), comprising a desired number of symbols, can be allocated as guard time to enable the mobile device 116 to time advance its uplink transmission. As a result, at least a portion of the data associated with the PDSCH, including DBCH, that is contained in the guard time region 309 can be omitted, erased, and/or otherwise eliminated by the base station 102 when transmitting PDSCH to the mobile devices, including mobile device 116.

In yet another aspect, the mobile device 116 (and other mobile devices associated with base station 102) can receive the PDSCH comprising the DBCH from the base station 102. The mobile device 116 can retrieve the guard time parameter contained in the DBCH. For instance, the mobile device 116 can decode the received data and can discover and identify the guard time parameter from the DBCH. The mobile device 116 can utilize the guard time parameter to determine a proper rate match to employ in order to rate match at least a portion of the other information received via the PDSCH and/or other information received from the base station 102. For example, the mobile device 116 and base station 102 can rate match data in a manner such as described herein with regard to FIG. 4 and DL subframe 400.

Until the mobile device 116 decodes at least a portion of the received PDSCH to obtain the DBCH and identify the guard time parameter, and implements the guard time parameter to determine a proper rate match to employ, data associated with the PDSCH that is contained in the guard time region 309 can be omitted, erased, and/or otherwise eliminated by the base station 102 when transmitting PDSCH to the mobile device 116. Once the mobile device 116 determines the proper rate match, which can be based at least in part on the guard time parameter, the base station 102 can rate match data (e.g., other PDSCH messages) being transmitted to the mobile device 116, and the mobile device 116 can automatically rate match other data associated with PDSCH (e.g., PDSCH received subsequent to the DBCH comprising the guard time parameter) around the guard time region 309. As a result, other PDSCH data will not occupy the guard time region 309 and such data will not be omitted, erased, or eliminated by the base station 102. The mobile device 116, by rate matching at least a portion of the information received via the PDSCH, can thereby improve reception of PDSCH and/or other communications between the mobile device 116 and base station 102.

For example, when the mobile device 116 is acquiring the base station 102, the base station 102 can prepare to transmit (e.g., broadcast) PDSCH to the mobile device 116 (and other mobile devices), where the PDSCH contains DBCH, which includes the guard time parameter, and where the DBCH can be associated with a first system information block. As the mobile device 116 does not yet have the guard time parameter, the base station 102 can know that this PDSCH containing the guard time parameter should not be rate matched and can allocate a specified number of resource elements of the slot 308 as a guard time region 309. The base station 102 can facilitate erasing the portion of data of PDSCH that occupies the guard time region 309, and the PDSCH can be transmitted from the base station 102 to the mobile device 116. The mobile device 116 can decode the received PDSCH and can obtain the guard time parameter related to the guard time interval duration from the DBCH. When the base station 102 is preparing to transmit another PDSCH message (e.g., PDSCH associated with a second system information block), which can contain other system information, user data, and/or other information, the base station 102 can know that the mobile device 116 has received the guard time parameter as part of the PDSCH associated with the first system information block, and the base station 102 can determine that data associated with this next PDSCH can be rate matched. The base station 102 can rate match the data associated with the next PDSCH around the guard time region 309 and will not have to erase data that otherwise would have been occupying the guard time region 309 if it was not rate matched. The base station 102 can transmit the rate matched PDSCH to the mobile device 116 (and other mobile devices), and the mobile device 116 can rate match data associated with the next PDSCH based at least in part on the previously received guard time parameter.

Figure 5:
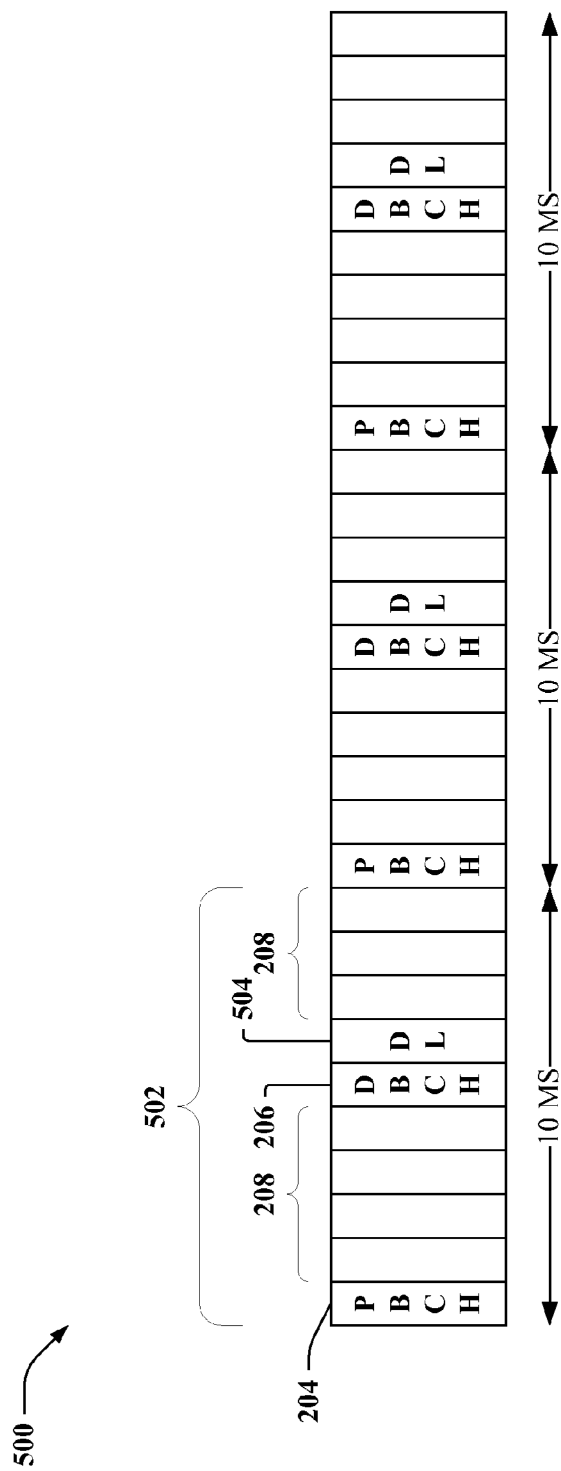
FIG. 5 illustrates an example radio frame sequence in accordance with one embodiment of the disclosed subject matter.

In accordance with still another embodiment, the radio frame sequence can be defined for the communication system such that the subframe immediately following a prior subframe containing DBCH can be designated or configured as a DL subframe. As a result, there does not have to be an allocation of guard time in the subframe 206, which can be allocated for transmission of at least a portion of the system parameters via the DBCH, since the next subframe is not designated as an UL subframe. Turning briefly to FIG. 5, illustrated is an example radio frame sequence 500 in accordance with one embodiment of the disclosed subject matter. Radio frame sequence 500 can comprise a plurality of radio frames 502. In accordance with the example embodiment, radio frame 502 can be 10 ms long, and can further be subdivided into a plurality of subframes (e.g., 10 subframes), wherein each subframe can be 1 ms. The sub-division of frame 502 also can be viewed in terms of sub-dividing radio frame 502 into a plurality of slots (e.g., 20 slots), wherein each slot can be 0.5 ms, where each subframe can comprise two consecutive slots.

Radio frame sequence 500 can include subframes that can be allocated for DL transmission of system parameter messages, such as subframe 204, which can be designated for DL transmission of a system parameter message(s) and can comprise at least a portion of the system parameters (e.g., DL system bandwidth; number of transmits antennas, MBFSN related parameters, . . . ) via the PBCH, and subframe 206, which can be designated for DL transmission of other system parameter message(s) and can comprise at least another portion of the system parameters (e.g., RACH parameters; MIMO/precoding parameters; TDD configuration; one or more PLMN identities, . . . ) via the DBCH. The various system parameter messages can be communicated to one or more mobile devices (e.g., 116, 122) operating in the wireless communication system. In accordance with another aspect, the radio frame 502 can further include one or more additional subframes 208. The one or more additional subframes 208 can be allocated for transmission of DL data or UL data, as desired.

It is to be appreciated and understood that the specific time allocation for PBCH and DBCH, as shown in FIG. 5, is only exemplary, different time allocations for PBCH and DBCH can be utilized in accordance with various other embodiments of the disclosed subject matter. In accordance with an aspect, separating system parameter messages into more than one portion (e.g., using PBCH and DBCH) can facilitate providing greater implementation flexibility. It is to be further appreciated and understood that the radio frame 502, subframe(s) 204, subframe(s) 206, and subframe(s) 208, each can be the same or similar as, and/or can comprise the same or similar functionality as, respective components, items, or elements, such as more fully described herein, for example, with regard to radio frame sequence 200.

Radio resources in radio frame 502 can be allocated for DL or UL transmission, as desired, except that, in accordance with an embodiment, a subframe 504 can be designated or configured as a DL subframe, which can be utilized for DL transmission of data, when the subframe 504 immediately follows a subframe 206 containing DBCH, to facilitate reducing, minimizing, or eliminating omissions, erasures, or eliminations of data in relation to the guard time interval. With subframe 504 designated and/or configured as a DL subframe immediately after subframe 206, resource elements at the end of a preceding slot (e.g., 308) do not have to be allocated for guard time (e.g., guard time region 309). As a result, data associated with the PDSCH, including the DBCH, being transmitted by the base station 102 as part of the preceding slot to a mobile device 116 does not have to be omitted, erased, or eliminated, since there is no guard time allocated for that slot.

Referring again to FIG. 1, in accordance with various embodiments, the DL subframe designation can be communicated to the mobile device 116 via system parameters (e.g., via PBCH or DBCH), or the particular communication system architecture can be structured so that the subframe immediately following a prior subframe containing DBCH can be designated or configured as a DL subframe, which can enable the mobile device 116 to know the DL subframe designation a priori. When the DL subframe designation, which designates that the subframe 504 immediately after subframe 206 is a DL subframe, is transmitted via PBCH, DBCH, or another communication, the DL subframe designation can be specified by a DL subframe parameter carried via the PBCH, DBCH, or other communication, where the DL subframe parameter can indicate at least which subframe(s) is designated as a DL subframe 504, and optionally can provide other information related to the structure of radio frame 502.

In accordance with an aspect, the base station 102 can include the guard time parameter in the DBCH, and the DBCH can be transmitted via the PDSCH to the mobile device 116 (and other mobile devices (e.g., 122)). For instance, a guard time parameter contained in the DBCH can specify the number of symbols allocated for the guard time interval. For example, the number of symbols for guard time can be up to three bits long to accommodate a potential guard time interval of up to five symbols (e.g., region 309). In one aspect, the base station 102 can refrain from transmitting the DBCH associated with the PDSCH and/or other information (e.g., data, such as resource element 310, resource element 316, etc.) in the unoccupied symbols (e.g., 404) of the guard time interval (e.g., region 309).

In one aspect, as described herein, until the mobile device 116 receives the DBCH containing the guard time parameter to facilitate determining a proper rate match to employ, the base station 102 can erase data, such as data associated with the PDSCH, contained in a guard time region 309 of slot 308, when transmitting data to mobile devices, such as mobile device 116. In accordance with another aspect, the mobile device 116 can receive the PDSCH comprising the DBCH from the base station 102. The mobile device 116 can decode the received information, and can retrieve the guard time parameter contained in the DBCH. The mobile device 116 can utilize the guard time parameter to determine a proper rate match to employ in order to rate match the other information received via the PDSCH and/or other information (e.g., resource element 310, resource element 316, other data).

In yet another aspect, after the mobile device 116 has received the guard time parameter, the base station 102 can rate match other information associated with the PDSCH (e.g., additional information, such as user data, other system parameters, unicast information, and/or other information carried by the PDSCH) based at least in part on the guard time parameter, where the other information can be matched around the unoccupied symbols (e.g., 404) associated with the guard time interval (e.g., region 309). The base station 102 can refrain from occupying the guard time interval with this other information associated with the PDSCH. For example, the base station 102 can rate match data in a manner such as described herein with regard to FIG. 1 and FIG. 4.

The mobile device 116 can receive data via the PDSCH (e.g., one or more other PDSCH messages), and the mobile device 116 can rate match the received data around the guard time region 309. For example, the mobile device 116 can rate match data in a manner such as described herein with regard to FIG. 1 and FIG. 4. As a result, the subject innovation can facilitate improved reception of PDSCH and more efficient communications between the mobile device 116 and base station 102, as compared to conventional systems, devices, or methods.

It is to be appreciated and understood that in accordance with another embodiment, the guard time parameter can be transmitted via the PBCH, when the subframe 504 is designated or configured as a DL subframe. However, when the subframe 504 is designated or configured as a DL subframe, it can be more desirable to transmit the guard time parameter via the PDSCH, due to the limited available space of the PBCH.

In accordance with yet another aspect of the disclosed subject matter, the subject innovation can facilitate rate matching multiple code blocks transmitted by the base station 102 and received by the mobile device 116 around the guard time region 309 of a slot 308 of a subframe to facilitate reducing or minimizing the amount of data that is omitted or erased by any single code block of a multi-code-block transmission (e.g., any data loss can be spread across all of the code blocks substantially evenly, so no single code block or subset of code blocks sustains loss of data that is significantly more than the data loss of another code block(s)). For instance, the base station 102 can transmit a desired number of code blocks via one or more transport channels, such as the downlink shared channel (DL-SCH), paging channel (PCH), and/or multicast channel (MCH) to the mobile device 116.

The code blocks can be rate matched on a per code block basis, based at least in part on the guard time parameter, so that data contained in each of the code blocks can be rate matched around the guard time region 309, where the code blocks can be mapped to the resource elements associated with the particular transport channel (e.g., mapped by row). With the code blocks rate matched, the code blocks can be concatenated to interlace the code blocks. The code blocks can be transmitted from the base station 102 to the mobile device 116. The mobile device 116 can receive the code blocks and can rate match the code blocks around the guard time region 309 using the proper rate match previously determined based at least in part on the guard time parameter to facilitate reducing or minimizing loss of data by a particular code block associated with the multi-code-block transmission.

Figure 6:
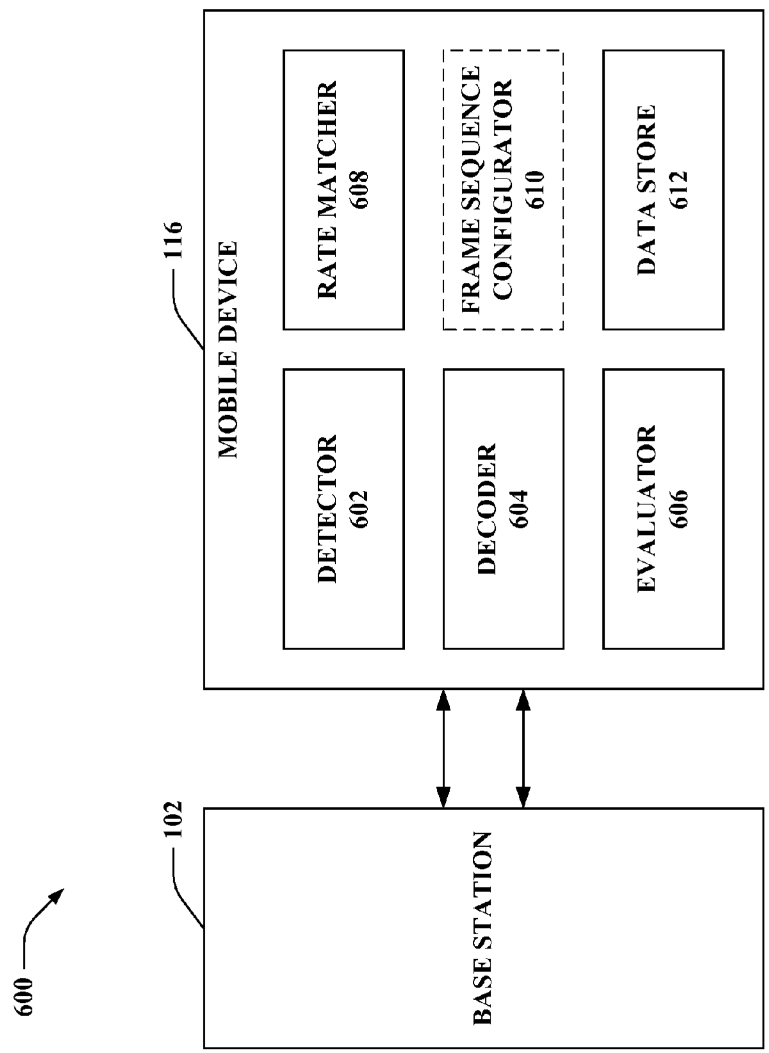
FIG. 6 depicts an example system that can facilitate rate matching of data in accordance with various embodiments presented herein.

Referring to FIG. 6, depicted is an example system 600 that can facilitate rate matching of data in accordance with various embodiments presented herein. System 600 can comprise a base station 102 in connection with a mobile device 116 in a wireless communication environment. It is to be appreciated and understood that the mobile device 116 and base station 102, each can be the same or similar as, and/or can comprise the same or similar functionality as, respective components, such as more fully described herein, for example, with regard to system 100.

In accordance with an aspect, the mobile device 116 can comprise a detector 602 that can facilitate detecting or identifying information contained in messages received from other communication devices, such as the base station 102. For instance, when the mobile device 116 receives a system parameter message(s) via PBCH or PDSCH, the detector 302 can decode the received message(s) using a decoder 604, and the detector 604 can identify one or more system parameters contained in the received message. The system parameters, which can be associated with the base station 102, can include, for example, a guard time parameter; DL subframe parameter; DL system bandwidth; number of transmits antennas, MBFSN related parameters; reference-signal transmit power; SFN; scheduling information of SU-1; value tag(s); CFI signaling; RACH parameters; MIMO/precoding parameters; TDD configuration; one or more PLMN identities; tracking area code, cell identity; cell barring information; "cell reserved for operator use" information per sharing PLMN; "cell reservation extension" information that can be common for all sharing PLMNs; scheduling information; SIB mapping information; and/or other parameters.

For example, the base station 102 can include a guard time parameter in a system parameter message, along with one or more other system parameters, that can be transmitted via PBCH or DBCH, as desired, where the DBCH can be mapped to the PDSCH. The mobile device 116 can receive the system parameter message, and the decoder 604 can decode the data in the message. The detector 602 can identify the parameters, including the guard time parameter, contained in the message, where the guard time parameter can facilitate determining a proper rate matching to employ with regard to received information.

In another aspect, the mobile device 116 can include an evaluator 606 that can evaluate information, such as system parameters, to facilitate configuring the mobile device 116 to facilitate efficient communication between the mobile device 116 and the base station 102. For instance, the evaluator 606 can evaluate the guard time parameter to determine a desired rate matching to employ with regard to received information (e.g., system parameters associated with the PDSCH), where the rate matching can be determined as a function of the guard time parameter (e.g., if the guard time parameter indicates that the guard time region is five elements long, the evaluator 606 can determine that the desired rate matching is to rate match around the five elements within the guard time region). In an embodiment, the evaluator 606 can evaluate a received DL subframe parameter to facilitate determining the configuration of the radio frame sequence, where, for example, a radio frame sequence can be defined for the communication system such that the subframe immediately following a subframe containing DBCH can be configured as a DL subframe.

In yet another aspect, the mobile device 116 can include a rate matcher 608 that can rate match data based at least in part on the determined rate matching. For instance, the rate matcher 608 can rate match data contained in a message, such as at least a portion of the information (e.g., system parameters) contained in the PDSCH, around the unoccupied symbols (e.g., 404) within the guard time region by employing the determined rate matching.

In another embodiment, the mobile device 116 optionally can contain a frame sequence configurator 610 that can facilitate specifying to the mobile device 116 and/or configuring the mobile device 116 to operate in accordance with a specified radio frame sequence based at least in part on a received DL subframe parameter. If a received DL subframe parameter indicates that the subframe immediately following a subframe containing DBCH is to be designated as a DL subframe, the frame sequence configurator 610 can facilitate configuring the mobile device 116 to operate in accordance with the desired radio frame sequence.

In another aspect, the mobile device 116 can comprise a data store 612 that can store information, such as data, system parameter information (e.g., guard time parameter), rate matching information, signal strength information, identification information, neighbor cell lists, and/or other information, related to base stations 102, and/or information related to the mobile device 116 and communication in the wireless communication environment. For instance, a determined rate matching can be retrieved from the data store 612, where the rate matching can be employed to rate match received information (e.g., at least a portion of the information contained in the PDSCH) to rate match around unoccupied symbols associated with a guard time region.

In accordance with an aspect, the data store 612 described herein can comprise volatile memory and/or nonvolatile memory. By way of illustration, and not limitation, nonvolatile memory can include read only memory (ROM), programmable ROM (PROM), electrically programmable ROM (EPROM), electrically erasable PROM (EEPROM), flash memory, and/or nonvolatile random access memory (NVRAM). Volatile memory can include random access memory (RAM), which can act as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The data store 612 is intended to comprise, without being limited to, these and any other suitable types of memory.

Figure 7:
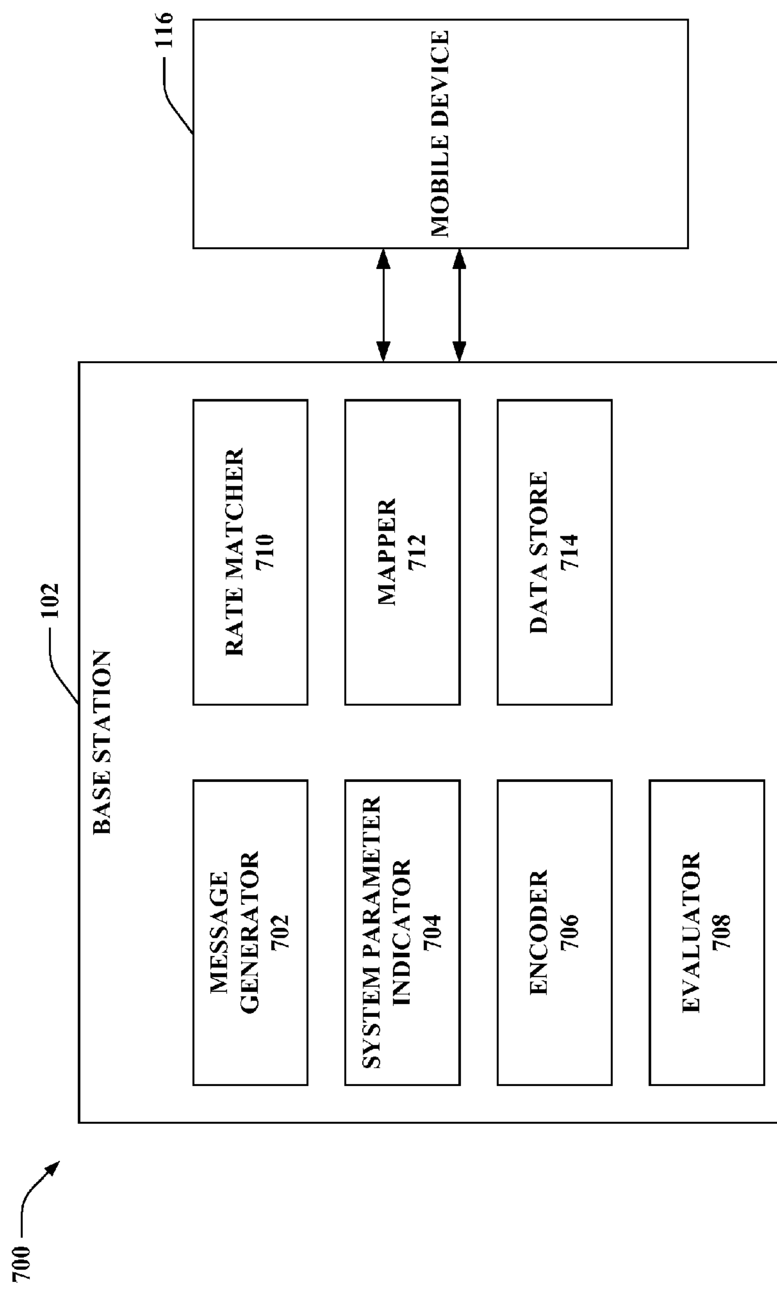
FIG. 7 illustrates an example system that can facilitate rate matching information to facilitate communication associated with a mobile device in accordance with an aspect of the disclosed subject matter.

Turning to FIG. 7, illustrated is an example system 700 that can facilitate rate matching information to facilitate communication associated with a mobile device in accordance with an aspect of the disclosed subject matter. System 700 can include a base station 102 in connection with a mobile device 116 in a wireless communication environment. It is to be appreciated and understood that the mobile device 116 and base station 102, each can be the same or similar as, and/or can comprise the same or similar functionality as, respective components, such as more fully described herein, for example, with regard to system 100 and system 600.

In one aspect, the base station 102 can include a message generator 702 that can facilitate generation of messages that can be utilized to communicate information to the mobile device 116, and/or another communication device (not shown) associated with system 700. For instance, the message generator 702 can generate one or more system parameter messages that can be transmitted to the mobile device 116. For example, a first system parameter message can contain a portion of the system parameters and can be transmitted via PBCH, and another system parameter message can contain another portion of the system parameters and can be transmitted via the DBCH. In accordance with various embodiments, the guard time parameter and/or the DL subframe parameter can be transmitted via the PBCH or DBCH.

In another aspect, the base station 102 can include a system parameter indicator 704 that can facilitate specifying a specified value of a particular system parameter, such as the guard time parameter or DL subframe parameter. For example, the specified value of the guard time parameter can be based at least in part on the length of the guard time region 309 of the DL subframe (e.g., 400).

In yet another aspect, the base station 102 can comprise an encoder 706 that can encode information to facilitate transmission of information to another communication device, such as mobile device 116. For instance, the encoder 706 can encode messages, such as system parameter messages, that can be transmitted via PBCH and/or DBCH to the mobile device 116.

In still another aspect, the base station 102 can contain an evaluator 708 that can evaluate information related to the guard time parameter associated with a DL subframe to facilitate determining a proper rate matching to employ to rate match data communicated in system parameter messages transmitted via PDSCH. In another aspect, the base station 102 can include a rate matcher 710 that can use the determined rate matching to rate match data (e.g., system parameter information) contained in messages, such as system parameter messages, that can be transmitted to the mobile device 116. Using the determined rate matching, the rate matcher 710 can rate match data around the unoccupied symbols associated with the guard time region 309, based at least in part on the guard time parameter, so that the data is not contained within the guard time region 309. In yet another aspect, the base station 102 can comprise a mapper 712 that can facilitate mapping the DBCH, which can include a portion of the system parameters that will be transmitted to a mobile device 116, to resource elements associated with the PDSCH to facilitate transmission of the DBCH to the mobile device 116.

In still another aspect, the base station 102 can contain a data store 714 that can store information, such as data, system parameter information (e.g., guard time parameter, DL subframe parameter), rate matching information, signal strength information, identification information, neighbor cell lists, and/or other information, related to a base station 102, information related to the mobile device 116, and/or information otherwise related to communication in the wireless communication environment. For instance, when communication is being established between the mobile device 116 and the base station 102, the base station 102 can retrieve system parameter information (e.g., the guard time parameter) from the data store 714 to facilitate generating system parameter messages that can be transmitted via PBCH or DBCH to the mobile device 116 to facilitate establishing efficient communication between the base station 102 and mobile device 116.

In accordance with an aspect, the data store 714 described herein can comprise volatile memory and/or nonvolatile memory. By way of illustration, and not limitation, nonvolatile memory can include read only memory (ROM), programmable ROM (PROM), electrically programmable ROM (EPROM), electrically erasable PROM (EEPROM), flash memory, and/or nonvolatile random access memory (NVRAM). Volatile memory can include random access memory (RAM), which can act as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The data store 714 is intended to comprise, without being limited to, these and any other suitable types of memory.

Referring to FIGS. 8-14, methodologies relating to rate matching of information (e.g., information contained in messages, such as system parameter messages) transmitted to a mobile device (e.g., 116) to facilitate efficient communication of data between the mobile device 116 and base station 102 in a wireless communication environment are illustrated. While, for purposes of simplicity of explanation, the methodologies are shown and described as a series of acts, it is to be understood and appreciated that the methodologies are not limited by the order of acts, as some acts can, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts can be required to implement a methodology in accordance with one or more embodiments.

Figure 8:
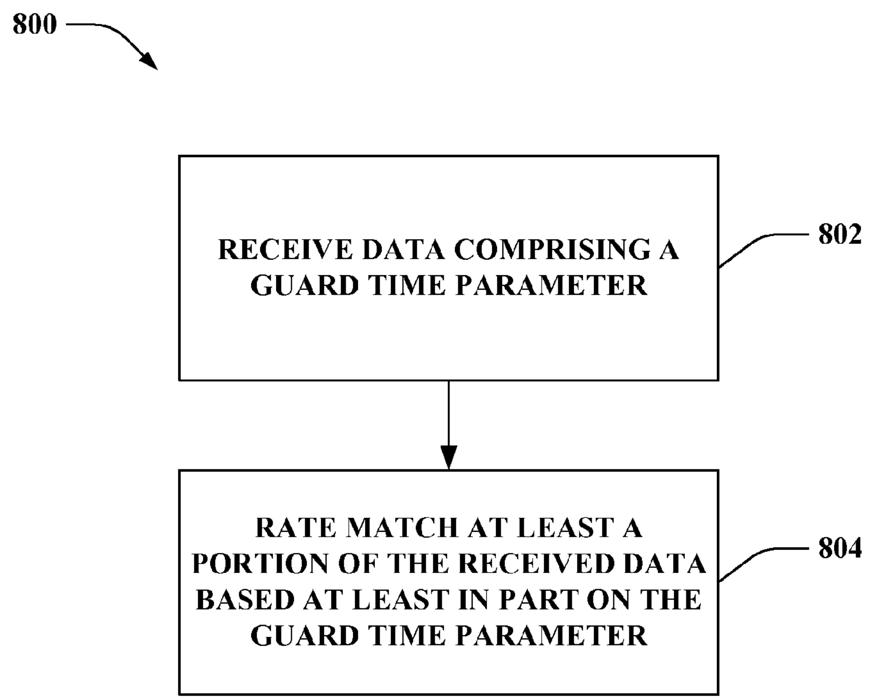
FIG. 8 is a depiction of an example methodology that can facilitate rate matching of messages to facilitate communications associated with the mobile device in a wireless communication system in accordance with an aspect of the disclosed subject matter.

With reference to FIG. 8, illustrated is a methodology 800 that can facilitate rate matching of messages to facilitate communications associated with the mobile device in a wireless communication system in accordance with an aspect of the disclosed subject matter. At 802, data comprising a guard time parameter can be received. In one aspect, a mobile device 116 can receive data, which can comprise a guard time parameter associated with a base station 102, from the base station 102. In accordance with various embodiments, the base station 102 can insert or identify the guard time parameter in a system parameter message transmitted via the PBCH or DBCH, as desired, to the mobile device 116. The base station 102 can transmit the DBCH via the PDSCH.

At 804, at least a portion of received data can be rate matched based at least in part on the guard time parameter. In accordance with various embodiments, the mobile device 116 can receive the guard time parameter via the PBCH or PDSCH from the base station 102. The mobile device 116 can determine a proper rate match to employ with regard to received data based at least in part on the guard time parameter. The mobile device 116 can rate match at least a portion of received data, including, for example, at least a portion of the data associated with the PDSCH, so that received data is rate matched around the unoccupied symbols associated with the guard time interval related to the guard time parameter, which can thereby enhance reception of data, such as PDSCH.

For example, if the guard time parameter is included with the DBCH transmitted to the mobile device 116 via the PDSCH, the mobile device 116 can decode the received data and can identify the guard time parameter in the received data. The mobile device 116 can employ a desired rate match, based at least in part on the guard time parameter, and can rate match at least a portion of other data associated with the PDSCH to facilitate improved reception of the PDSCH.

In another aspect, the base station 102 can rate match data transmitted via the PDSCH to the mobile device 116, based at least in part on the guard time parameter. The base station 102 can refrain from occupying the guard time interval, as the base station 102 can rate match the data around the unoccupied symbols associated with the guard time interval to facilitate improved reception of data, such as data associated with the PDSCH.

Figure 9:
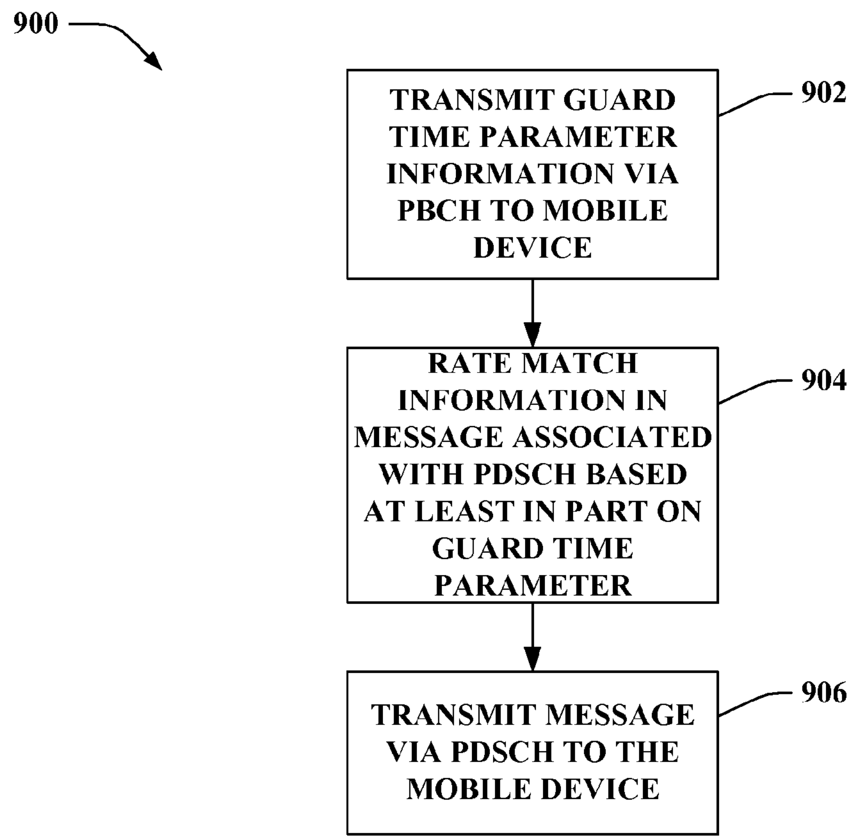
FIG. 9 is an illustration of an example methodology that can transmit guard time information via PBCH to facilitate rate matching of messages to facilitate communications associated with the mobile device in a wireless communication system in accordance with an aspect of the disclosed subject matter.

Referring to FIG. 9, depicted is a methodology 900 that can transmit guard time information via PBCH to facilitate rate matching of messages to facilitate communications associated with the mobile device in a wireless communication system in accordance with an aspect of the disclosed subject matter. At 902, a message comprising guard time parameter information (e.g., TDP guard time parameter) can be transmitted via PBCH to the mobile device (e.g., 116). In one aspect, a base station 102 can transmit a message, which can include a guard time parameter and/or other system parameters, via the PBCH to the mobile device 116 to facilitate enabling the mobile device 116 to perform rate matching of information, such as data associated with the PDSCH, received by the mobile device 116. The guard time parameter can specify the length of the guard time (e.g., the number of symbols for the guard time) for a DL subframe.

At 904, information in a message associated with the PDSCH can be rate matched based at least in part on the guard time parameter. In one aspect, the base station 102 can rate match the information (e.g., another portion of system parameters and/or other data) associated with the PDSCH, which can comprise DBCH (e.g. DBCH can be mapped to PDSCH), based at least in part on the guard time parameter, where the information associated with the PDSCH can be rate matched around the unoccupied symbols. In another aspect, the base station 102 can refrain from occupying during the guard time. At 906, the message can be transmitted via PDSCH to the mobile device 116. In one aspect, after rate matching the information in the message associated with the PDSCH, the base station 102 can transmit the message via PDSCH to the mobile device 116. As the mobile device 116 has already received the guard time parameter information, the mobile device 116 can rate match the information received via the PDSCH, which can result in enhanced reception of the PDSCH and communication by the mobile device 116.

Figure 10:
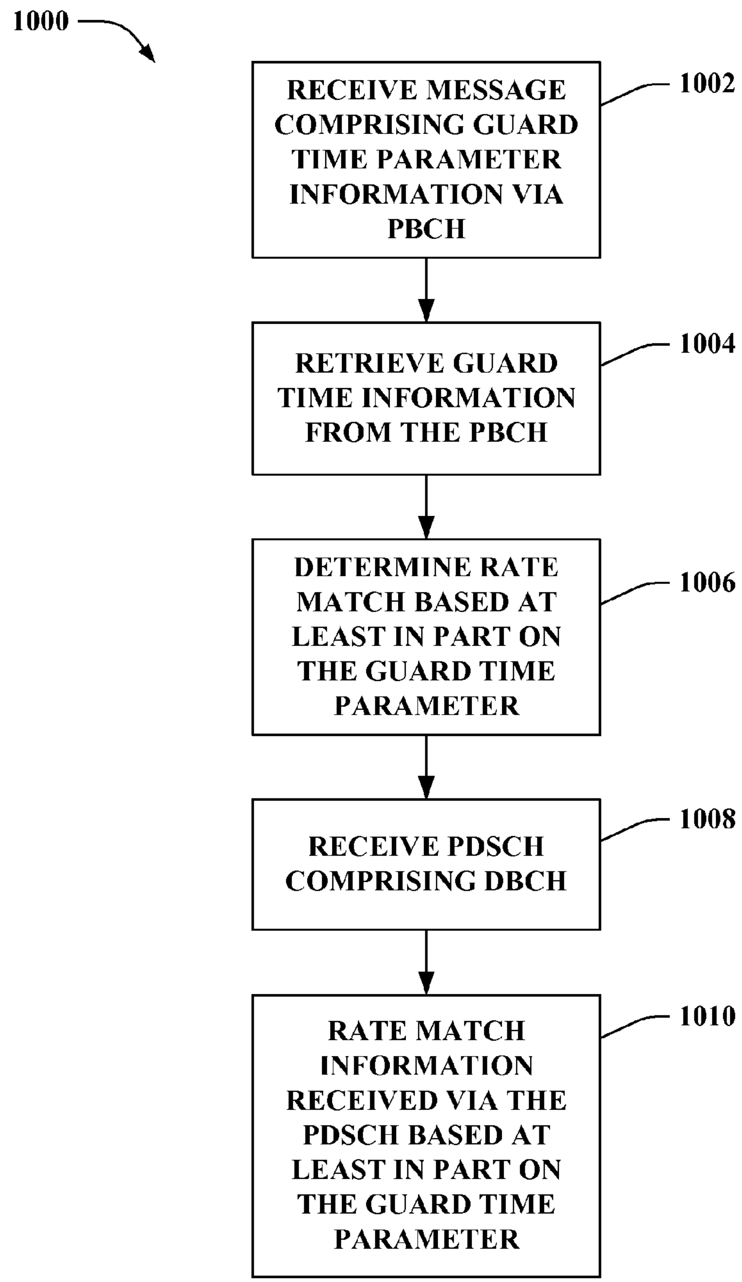
FIG. 10 is an illustration of an example methodology that can receive a guard time parameter via PBCH to facilitate rate matching of messages to facilitate communications associated with the mobile device in a wireless communication system in accordance with an aspect of the disclosed subject matter.

FIG. 10 illustrates a methodology 1000 that can receive a guard time parameter via PBCH to facilitate rate matching of messages to facilitate communications associated with the mobile device in a wireless communication system in accordance with an aspect of the disclosed subject matter. At 1002, a message, comprising a guard time parameter can be received via the PBCH. In an aspect, a mobile device (e.g., 116) can receive a message via the PBCH from a base station 102, where the message can contain one or more system parameters comprising at least a portion of the system parameters, including the guard time parameter, associated with the communication system.

At 1004, guard time parameter information can be retrieved from the PBCH. In one aspect, the mobile device 116 can detect and/or discover the guard time parameter information contained in the PBCH, and can retrieve the guard time parameter information from the PBCH.

At 1006, a desired rate match can be determined based at least in part on the received guard time parameter information. In accordance with an aspect, the mobile device 116 can determine the proper rate matching to employ when processing received information, such as PDSCH, based at least in part on the guard time parameter information, so that the mobile device 116 can rate match information (e.g., system parameter and/or other information associated with the PDSCH) around unoccupied symbols (e.g., 404) associated with the guard time region 309 of a DL subframe (e.g., 400).

At 1008, PDSCH, which can include DBCH, can be received. In one aspect, the mobile device 116 can receive the PDSCH that can include DBCH, comprising a system parameter message containing another portion of the system parameters, and/or other information (e.g., unicast information) from the base station 102. At 1010, information received via PDSCH can be rate matched based at least in part on the guard time parameter. In an aspect, the mobile device 116 can decode the PDSCH and can employ the determined rate matching to rate match information contained in the received PDSCH, including DBCH, when processing that information. This can result in improved reception of information, such as PDSCH, by the mobile device 116.

Figure 11:
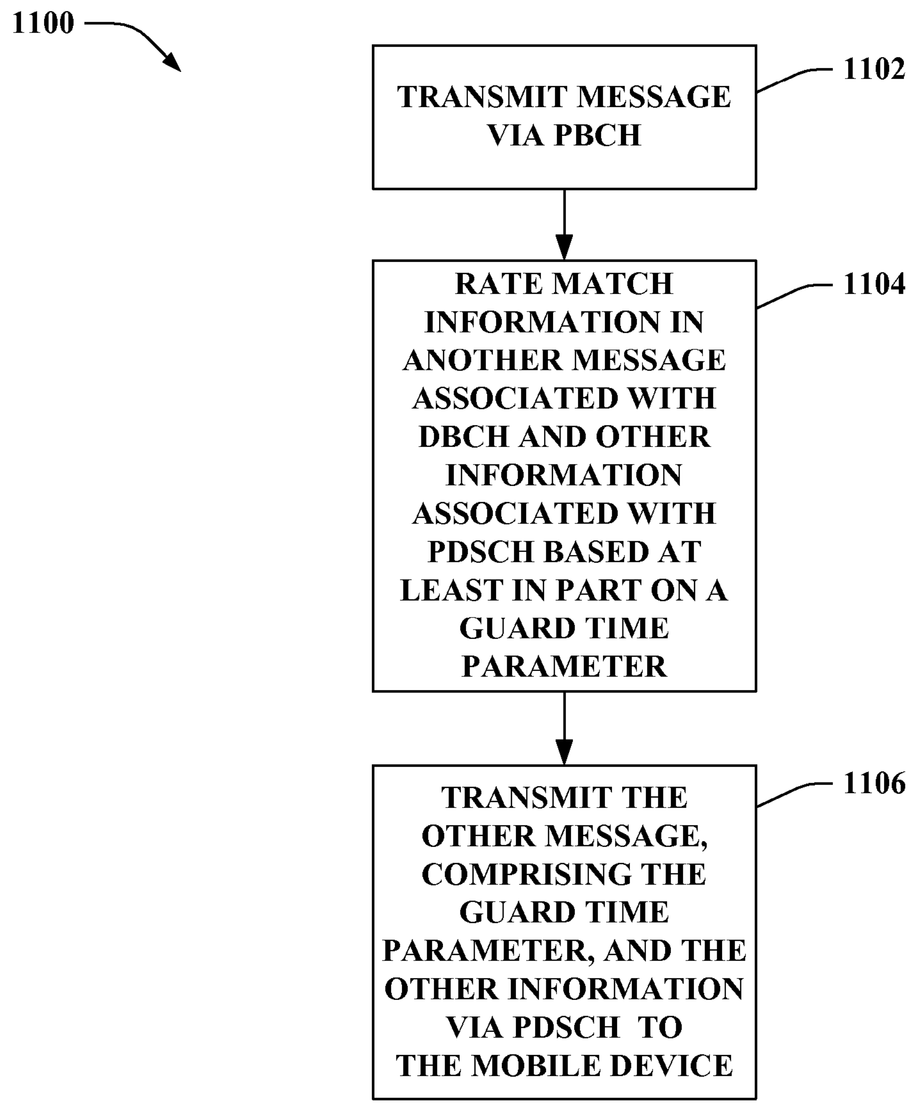
FIG. 11 is an illustration of an example methodology that can transmit a guard time parameter via DBCH to facilitate rate matching of messages to facilitate communications associated with the mobile device in a wireless communication system in accordance with an aspect of the disclosed subject matter.

FIG. 11 illustrates a methodology 1100 that can transmit a guard time parameter via DBCH to facilitate rate matching of messages to facilitate communications associated with the mobile device in a wireless communication system in accordance with an aspect of the disclosed subject matter. At 1102, a message can be transmitted via PBCH to a mobile device (e.g., 116). In an aspect, a base station 102 can transmit PBCH, which can comprise a message containing one or more system parameters to the mobile device 116 to facilitate communication between the base station 102 and the mobile device 116.

At 1104, data can be rate matched based at least in part on a guard time parameter associated with the DL subframe of the communication system. In one aspect, the base station 102 can rate match data, such as information (e.g., DBCH containing other system parameters; other information associated with PDSCH) to be transmitted via the PDSCH, where the PDSCH can include DBCH that can comprise guard time parameter information. The data can be rate matched based at least in part on the guard time parameter. Rate matching data can facilitate improving reception of data by the mobile device 116. In another aspect, the data can be encoded in accordance with a desired encoding technique or algorithm.

At 1106, the data (e.g., rate matched data) can be transmitted via PDSCH to the mobile device 116. In accordance with an aspect, the base station 102 can transmit the data, which can be rate matched based at least in part on the guard time parameter, via the PDSCH to the mobile device 116. The mobile device 116 can decode the data in accordance with a desired decoding technique or algorithm. The mobile device 116 can discover the guard time parameter from the DBCH and can utilize the guard time parameter to determine a rate match to employ with regard to information, including rate matching at least a portion of information (e.g., system parameters; other information associated with the PDSCH) contained in the PDSCH, received from the base station 102 to facilitate communication between the mobile device 116 and the base station 102.

Figure 12:
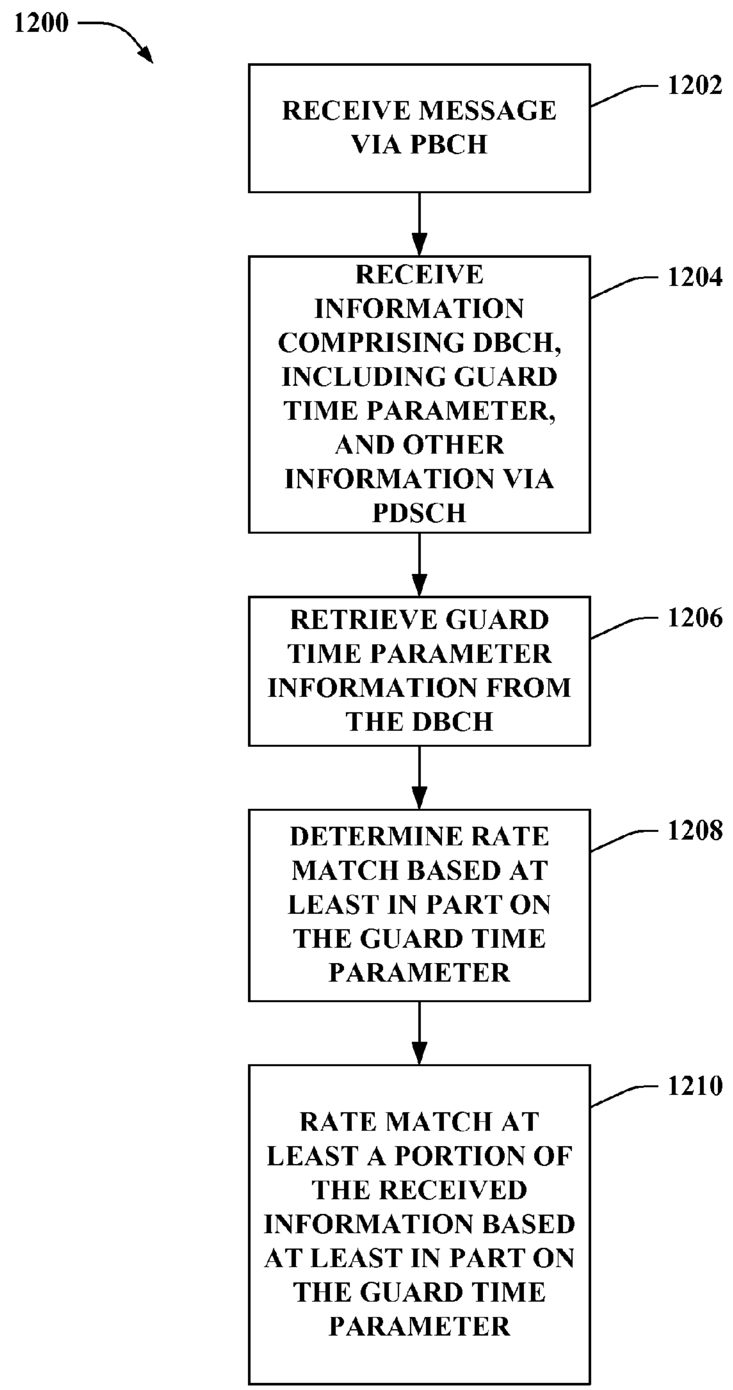
FIG. 12 is a depiction of an example methodology that can receive a guard time parameter via DBCH to facilitate rate matching of messages to facilitate communications associated with the mobile device in a wireless communication system in accordance with an aspect of the disclosed subject matter.

FIG. 12 illustrates a methodology 1200 that can receive a guard time parameter via DBCH to facilitate rate matching of messages to facilitate communications associated with the mobile device in a wireless communication system in accordance with an aspect of the disclosed subject matter. At 1202, a message can be received via PBCH. In an aspect, a mobile device (e.g., 116) can receive a message, such as a system parameter message, via PBCH from a base station 102 in communication with the mobile device 116. The mobile device 116 can decode the message in accordance with a desired decoding algorithm or technique. The message can comprise a portion of the system parameters that the mobile device 116 can utilize to facilitate communication between the mobile device 116 and base station 102.

At 1204, information comprising the DBCH, which can include guard time parameter information, and other information (e.g., information associated with the PDSCH) can be received via PDSCH. In one aspect, the mobile device 116 can receive the PDSCH from the base station 102. The mobile device 116 can decode information in the PDSCH in accordance with the desired decoding algorithm or technique. The PDSCH can comprise the DBCH, which can contain a message containing one or more other system parameters, including the guard time parameter associated with the DL subframe associated with the communication system. The information contained in the PDSCH can be utilized to facilitate efficient communication between the mobile device 116 and base station 102. For example, the guard time parameter can facilitate enabling the mobile device 116 to determine the guard time interval to facilitate rate matching of information received via the base station 102.

At 1206, the guard time parameter can be retrieved from the PDSCH. In an aspect, the mobile device 116 can decode the information, such as the DBCH, contained in the PDSCH, and can discover the guard time parameter. At 1208, a rate match can be determined based at least in part on the guard time parameter. In accordance with an aspect, the mobile device 116 can determine a desired rate match to employ with regard to information received from the base station 102, including at least a portion of the information received via the PDSCH, based at least in part on the guard time parameter.

At 1210, at least a portion of the information received via the PDSCH can be rate matched using the determined rate match. In one aspect, the mobile device 116 can rate match at least a portion of the information in a PDSCH message using the determined rate match. The information can be at least a portion of the system parameter information contained in the DBCH and/or at least a portion of the other information contained in the PDSCH. Rate matching at least a portion of the information in the received PDSCH can facilitate efficient communication between the mobile device 116 and base station 102. Since the guard time parameter (and thus the guard time interval) is known by the mobile device 116, the information can be rate matched by the base station 102 when transmitted to the mobile device 116 (and other mobile devices), and the guard time region 309 can remain unoccupied, and further, the base station 102 will not omit, erase, or otherwise eliminate desired information which may otherwise have been placed in the guard time region 309, if the desired information had not been rate matched. The mobile device 116 can rate match the received information. As a result, the subject innovation can provide more efficient communication between the mobile device 116 and base station 102.

It is to be understood that when the mobile device 116 initially receives the PDSCH, including the DBCH comprising the guard time parameter, the mobile device 116 may not know the guard time parameter and/or the number of resource elements that are to be allocated for guard time (e.g. the size of the guard time region 309) when an UL subframe immediately follows a subframe containing DBCH. The mobile device 116 can decode the PDSCH and DBCH as they are received and can identify the guard time parameter in the DBCH. The mobile device 116 can determine a proper rate match based at least in part on the guard time parameter. However, until the mobile device 116 determines and implements a proper rate match on the received data, data received via the PDSCH that is contained in the guard time region 309 can be omitted, erased, and/or otherwise eliminated by the base station 102. After the base station 102 has transmitted the guard time parameter to the mobile device 116 (and/or other mobile devices), the base station 102 can rate match data (e.g., via PDSCH) transmitted to the mobile device 116 (and/or other mobile devices). The mobile device 116, using a proper rate match determined based at least in part on the guard time parameter, can automatically rate match received data (e.g., via PDSCH) around the guard time region 309. As a result, the data will not occupy the guard time region 309 and such data will not be omitted, erased, or eliminated by the base station 102.

Figure 13:
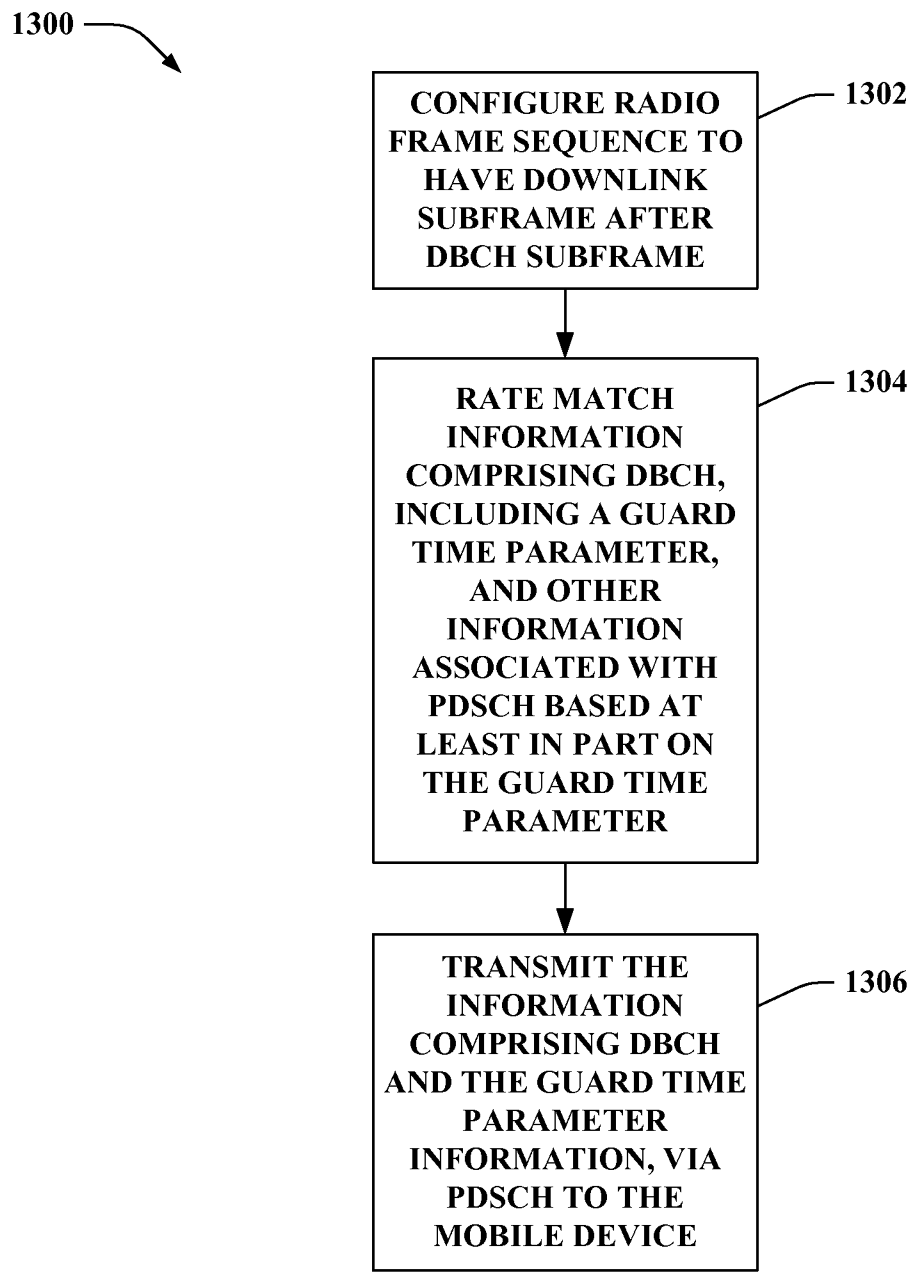
FIG. 13 is an illustration of an example methodology that can configure a radio frame sequence to facilitate rate matching of messages to facilitate communications associated with the mobile device in a wireless communication system in accordance with an aspect of the disclosed subject matter.

FIG. 13 illustrates a methodology 1300 that can configure a radio frame sequence to facilitate rate matching of messages to facilitate communications associated with the mobile device in a wireless communication system in accordance with an aspect of the disclosed subject matter. At 1302, a radio frame sequence can be configured so that the subframe after a DBCH subframe can be designated as a DL subframe. In accordance with an embodiment, a base station 102 can communicate system parameters, including a parameter designating the subframe after the DBCH subframe as a DL subframe, via PBCH or DBCH, to a mobile device (e.g., 116). In accordance with another embodiment, the architecture of the wireless communication system can be structured so that the subframe after the DBCH subframe can be a DL subframe, and this architecture can be known a priori by the mobile device 116.

At 1304, information associated with PDSCH can be rate matched based at least in part on guard time parameter. In one aspect, the base station 102 can rate match information associated with the PDSCH, which can include DBCH that can comprise a guard time parameter associated with a DL subframe (and/or a DL subframe parameter, if the DL subframe parameter is being transmitted via DBCH).

At 1306, the information can be transmitted via the PDSCH. In accordance with an aspect, the information, including the guard time parameter and/or DL subframe parameter, can be transmitted via the PDSCH from the base station 102 to the mobile device 116. In another aspect, prior to being transmitted, the information can be encoded in accordance with a desired encoding algorithm or technique. The guard time parameter can be utilized by the mobile device 116 to facilitate communication between the mobile device 116 and base station 102. For instance, the mobile device 116 can utilize the guard time parameter to determine a rate match to employ with regard to information (e.g., at least a portion of the PDSCH) received by the mobile device 116 from the base station 102.

Figure 14:
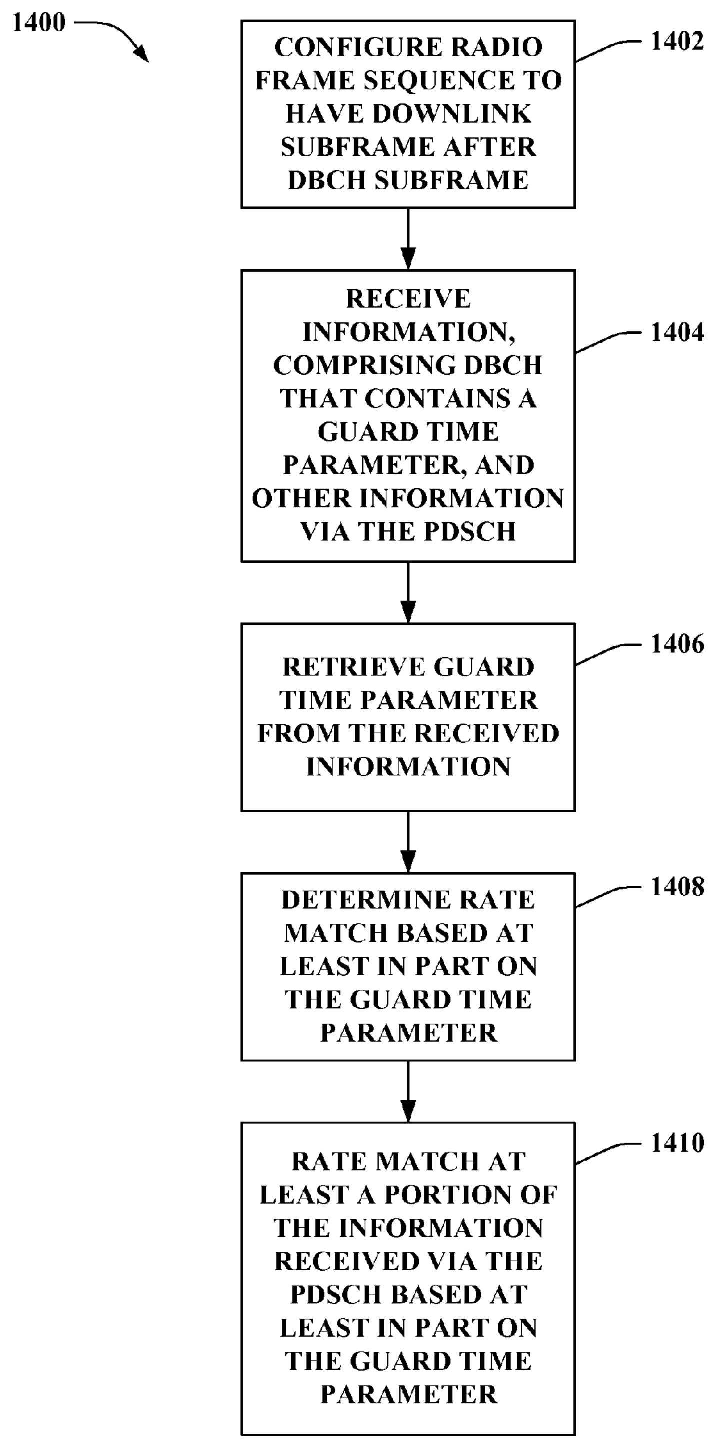
FIG. 14 is a depiction of an example methodology that can configure a radio frame sequence to facilitate rate matching of data to facilitate communications associated with the mobile device in a wireless communication system in accordance with an aspect of the disclosed subject matter.

FIG. 14 illustrates a methodology 1400 that can configure a radio frame sequence to facilitate rate matching of data to facilitate communications associated with the mobile device in a wireless communication system in accordance with an aspect of the disclosed subject matter. At 1402, a radio frame sequence can be configured so that the subframe after a DBCH subframe can be designated as a DL subframe. In accordance with various embodiments, a base station 102 can communicate system parameters, including a parameter designating the subframe after the DBCH subframe as a DL subframe, via the PBCH or DBCH, to a mobile device (e.g., 116). In accordance with another embodiment, the architecture of the wireless communication system can be structured so that the subframe after the DBCH subframe can be a DL subframe, and this architecture can be known a priori by the mobile device 116. If the DL subframe parameter is received via the PBCH or DBCH, the mobile device 116 can identify the DL subframe parameter in the PBCH or DBCH and can utilize the DL subframe parameter to facilitate configuring the mobile device 116 to operate in accordance with the DL subframe parameter and the desired radio frame sequence employed by the communication system.

At 1404, information, comprising the DBCH that includes a guard time parameter, and other information associated with the PDSCH can be received via the PDSCH. In an aspect, a mobile device (e.g., 116) can receive the information, including the guard time parameter, via the PDSCH from a base station 102. In an aspect, prior to sending the PDSCH, the information can be encoded by the base station 102 in accordance with a desired encoding algorithm or technique; and, after receiving the PDSCH, the mobile device 116 can decode the information in the PDSCH in accordance with a desired decoding algorithm or technique. In another aspect, the guard time parameter can facilitate enabling the mobile device 116 to determine the guard time region 309 associated with the DL subframe, and the guard time parameter can be utilized by the mobile device 116 to facilitate rate matching data around the guard time region 309 to facilitate enhanced reception of PDSCH by the mobile device 116.

At 1406, the guard time parameter can be retrieved from the received information. In one aspect, the mobile device 116 can retrieve the guard time parameter from the received DBCH, which can also contain one or more other system parameters associated with the communication system. At 1408, a rate match can be determined based at least in part on the guard time parameter. In accordance with an aspect, the mobile device 116 can determine a desired rate match to employ with regard to information received from the base station 102, including at least a portion of the information received via the PDSCH, based at least in part on the guard time parameter.

At 1410, at least a portion of the information received via the PDSCH can be rate matched using the determined rate match. In one aspect, the mobile device 116 can rate match at least a portion of the information in the PDSCH using the determined rate match. For example, at least a portion of the information (e.g., system parameters) associated with the DBCH and/or at least a portion of the other information received via the PDSCH can be rate matched, using the determined rate match, so that the data is rate matched around unoccupied symbols associated with the guard time region 309 associated with the DL subframe (e.g., 400). Rate matching at least a portion of the information received via the PDSCH can facilitate efficient communication between the mobile device 116 and base station 102. Since the guard time interval is known by the mobile device 116, the information, or a portion thereof, can be rate matched, so the base station 102 does not omit, erase, or otherwise eliminate information which may otherwise have been placed in the guard time region 309 of the DL subframe, if the information had not been rate matched. As a result, the reception of the PDSCH by the mobile device 116 can be improved.

It will be appreciated that, in accordance with one or more aspects described herein, inferences can be made relating to the length of a guard time region 309; a proper rate matching to be employed with regard to received information (e.g., information, or portion thereof, received via PDSCH); and/or a location of DBCH in time, to facilitate communication associated with a mobile device in a communication network. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

For example, one or more methods presented above can include making an inference(s) pertaining to a proper rate matching to be employed by a base station and/or mobile device with regard to transmitted or received information (e.g., PDSCH); the length of a guard time region 309; the number of symbols associated with the guard time region 309; and/or the location of DBCH in time. It will be appreciated that the foregoing examples are illustrative in nature and are not intended to limit the number of inferences that can be made or the manner in which such inferences are made in conjunction with the various embodiments and/or methods described herein.

Figure 15:
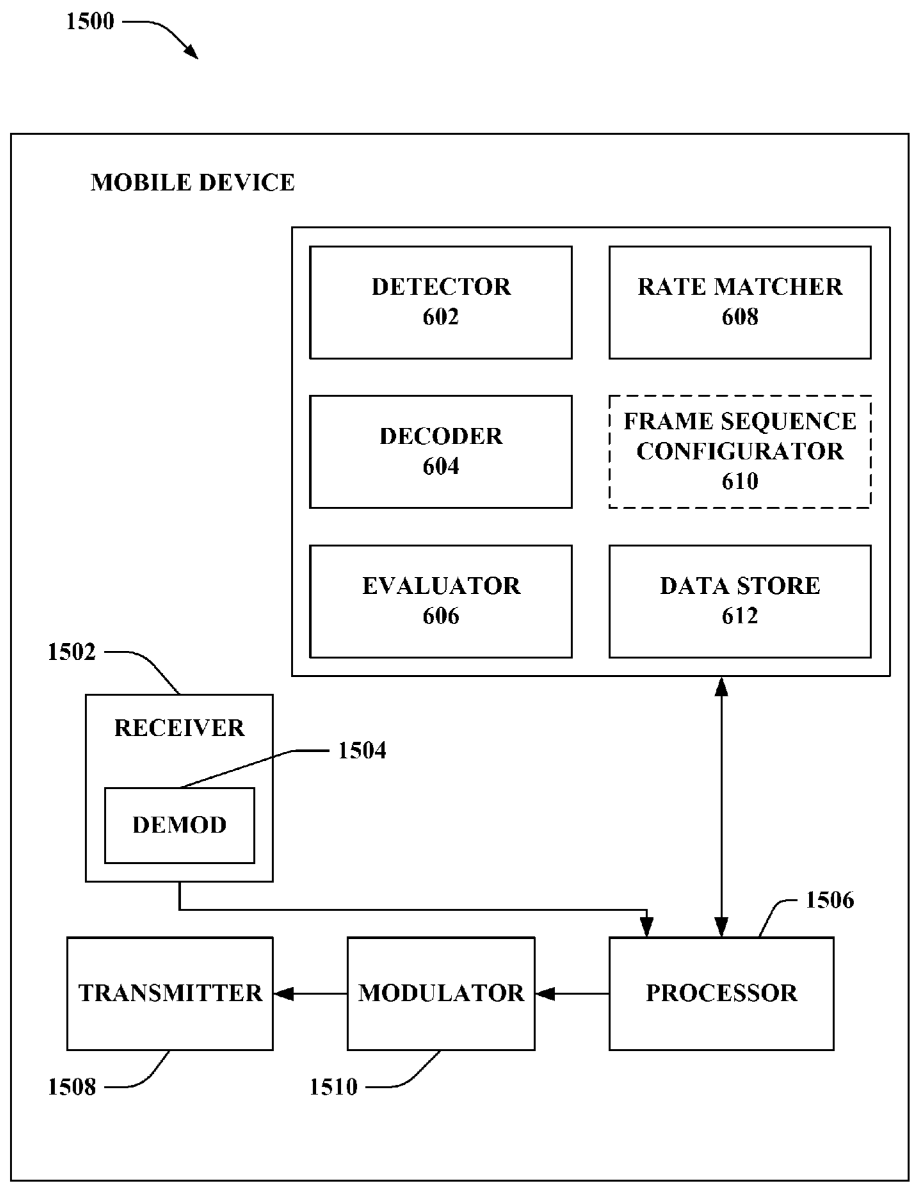
FIG. 15 is an illustration of an example mobile device that can facilitate communications associated with a mobile device in a wireless communication system in accordance with an aspect of the disclosed subject matter.

FIG. 15 is an illustration of a mobile device 1500 that can facilitate communications associated with a mobile device in a wireless communication system in accordance with an aspect of the disclosed subject matter. It is to be appreciated that the mobile device 1500 can be the same or similar as, and/or can comprise the same or similar functionality as, mobile device 116, such as more described herein, for example, with regard to system 100, system 600, system 700, methodology 800, methodology 900, methodology 1000, methodology 1100, methodology 1200, methodology 1300, and methodology 1400.

Mobile device 1500 can comprise a receiver 1502 that receives a signal from, for instance, a receive antenna (not shown), and performs typical actions thereon (e.g., filters, amplifies, downconverts, etc.) the received signal and digitizes the conditioned signal to obtain samples. Receiver 1502 can be, for example, an MMSE receiver, and can comprise a demodulator 1504 that can demodulate received symbols and provide them to a processor 1506 for channel estimation. Processor 1506 can be a processor dedicated to analyzing information received by receiver 1502 and/or generating information for transmission by a transmitter 1508, a processor that controls one or more components of mobile device 1500, and/or a processor that both analyzes information received by receiver 1502, generates information for transmission by transmitter 1508, and controls one or more components of mobile device 1500. Mobile device 1500 can also comprise a modulator 1510 that can work in conjunction with the transmitter 1508 to facilitate transmitting signals (e.g., data) to, for instance, a base station (e.g., 102), another mobile device (e.g., 122), etc.

In one aspect, the processor 1506 can be connected to a detector 602 that can facilitate identifying and/or retrieving a guard time parameter associated with a DL subframe and/or a DL subframe parameter related to a desired radio frame sequence. In another aspect, the processor 1506 can be connected to a decoder 604 that can decode information (e.g., encoded information), such as information received via PBCH and/or PDSCH, in accordance with a specified decoding algorithm or technique to discover the desired data (e.g., system parameters) from the encoded information. The processor 1506 also can be connected to an evaluator 606 that can evaluate a received guard time parameter to determine a proper rate matching that can be employed with regard to information, or at least a portion thereof, received by the mobile device 1500. In another aspect, the evaluator 606 also can evaluate a received DL subframe parameter and can determine a desired configuration for the mobile device 1500, so that the mobile device 1500 can operate in accordance with a specified radio frame sequence. For example, the DL subframe parameter can specify that the subframe immediately after a subframe containing DBCH is designated as a DL subframe, and the evaluator 606 can determine that a DL subframe follows immediately after a subframe containing DBCH based at least in part on the DL subframe parameter.

The processor 1506 also can be connected to a rate matcher 608 that can facilitate rate matching received information, or at least a portion thereof, around unoccupied symbols associated with a guard time region 309 of a DL subframe (e.g., 400). For instance, at least a portion of the information received via the PDSCH can be rate matched in accordance with a determined rate match based at least in part on the guard time parameter. In accordance with an embodiment, mobile device 1500 optionally can include a frame sequence configurator 610 that can be operatively coupled to the processor 1506. The frame sequence configurator 610 can configure the mobile device 1500, based at least in part on a received DL subframe parameter, so that the mobile device 1500 can operate in accordance with a specified radio frame sequence associated with the communication system.

Mobile device 1500 can additionally comprise data store 612 that can be operatively coupled to processor 1506 and can store information, such as data, system parameter information (e.g., guard time parameter, DL subframe parameter), rate matching information, signal strength information, identification information, neighbor cell lists, and/or other information, related to base stations 102, and/or information related to the mobile device 1500 and communication in the wireless communication environment. Data store 612 can additionally store protocols and/or algorithms associated with evaluating received guard time information and/or a DL subframe parameter, determining a proper rate matching, determining a configuration of the mobile device 1500 to operate in accordance with a specified radio frame sequence, and/or other functions related to the mobile device 1500.

It is to be appreciated and understood that the detector 602, decoder 604, evaluator 606, rate matcher 608, frame sequence configurator 610, and data store 612 each can be the same or similar as, or can comprise the same or similar functionality as, respective components such as more fully described herein, for example, with regard to system 600. It is to be further appreciated and understood that the detector 602, decoder 604, evaluator 606, rate matcher 608, frame sequence configurator 610, and data store 612 each can be a stand-alone unit (as depicted), can be included within the processor 1506, can be incorporated within another component, and/or virtually any suitable combination thereof, as desired.

Figure 16:
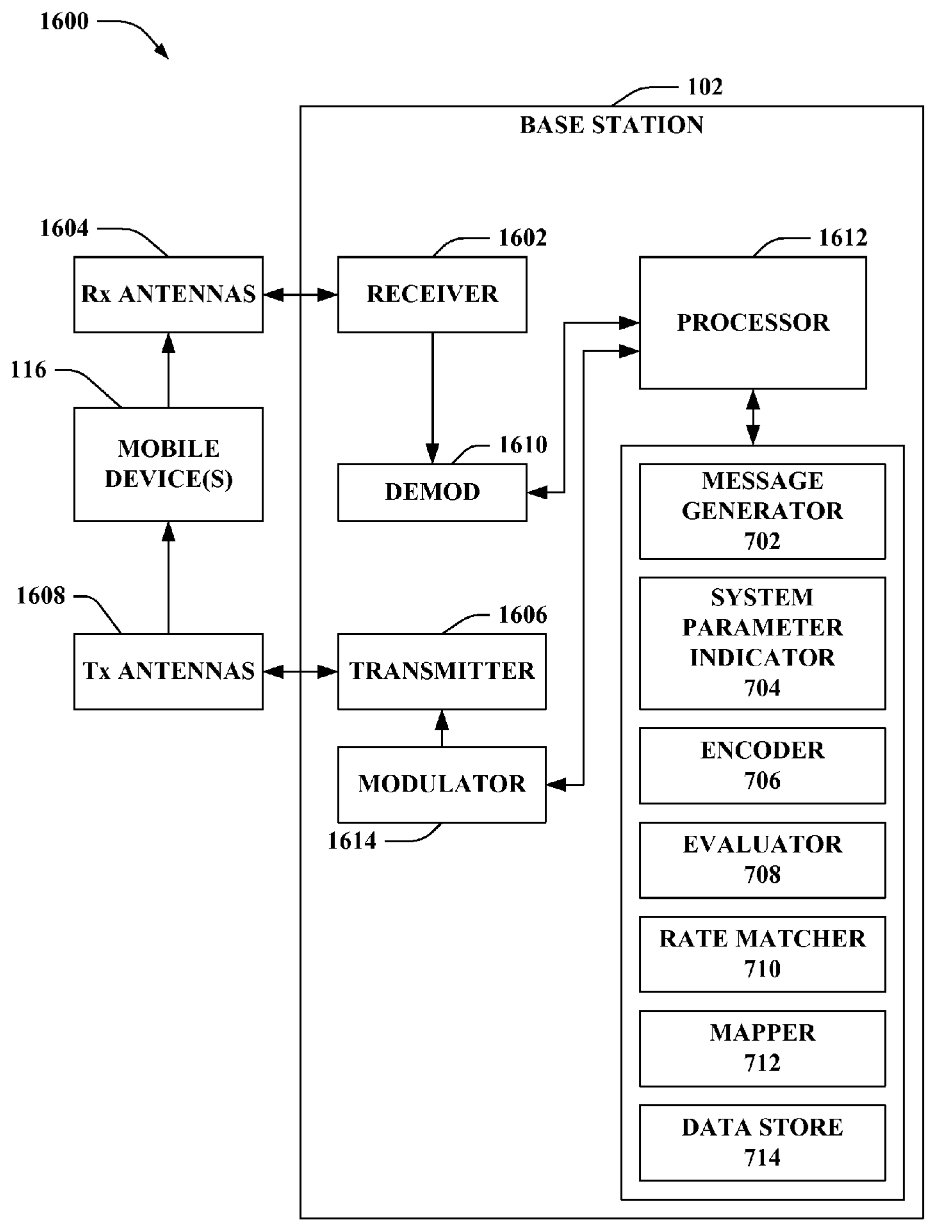
FIG. 16 is a depiction of an example system that can facilitate communications associated with a mobile device in a wireless communication system in accordance with an aspect of the disclosed subject matter.

FIG. 16 is an illustration of a system 1600 that can facilitate communications associated with a mobile device in a wireless communication system in accordance with an aspect of the disclosed subject matter. System 1600 can comprise a base station 102 (e.g., access point, . . . ). The base station 102 can include a receiver 1602 that can receive signal(s) from one or more mobile devices 116 through a plurality of receive antennas 1604, and a transmitter 1606 that can transmit signals (e.g., data) to the one or more mobile devices 116 through a transmit antenna 1608. Receiver 1602 can receive information from receive antennas 1604 and can be operatively associated with a demodulator 1610 that can demodulate received information. Demodulated symbols can be analyzed by a processor 1612 that can be a processor dedicated to analyzing information received by receiver 1602 and/or generating information for transmission by a transmitter 1606, a processor that controls one or more components of base station 102, and/or a processor that both analyzes information received by receiver 1602, generates information for transmission by transmitter 1606, and controls one or more components of base station 102. The base station 102 can also comprise a modulator 1614 that can work in conjunction with the transmitter 1606 to facilitate transmitting signals (e.g., data) to, for instance, a mobile device 116, another device, etc.

Processor 1612 can be connected with a message generator 702 that can facilitate generating one or more messages, such as data messages or system parameter messages, that can be transmitted to other communication devices, such as a mobile device 116. Processor 1612 also can be connected to a system parameter indicator 704 that can provide one or more system parameters (e.g., guard time parameter, DL subframe parameter), which can be inserted into a system parameter message(s), as desired, to be transmitted to the mobile device 116.

In another aspect, processor 1612 can be connected with an encoder 706 that employ a desired encoding algorithm or technique to encode a message(s), such as a message to be transmitted to the mobile device 116. In still another aspect, the processor 1612 can be connected with an evaluator 708 that can evaluate a guard time parameter and/or other information related to a guard time parameter to facilitate determining a proper rate matching that can be employed to rate match information (e.g., information transmitted via the PDSCH), such as information being transmitted to the mobile device 116.

Processor 1612 can be connected with a rate matcher 710 that can facilitate rate matching received information, or at least a portion thereof, around unoccupied symbols associated with a guard time region 309 of a DL subframe (e.g., 400). For instance, at least a portion of the information, which is to be transmitted via the PDSCH to the mobile device 116, can be rate matched in accordance with the determined rate match based at least in part on the guard time parameter. In another aspect, the processor 1612 can be connected with a mapper 712 that can facilitate mapping the DBCH, which can include a portion of the system parameters that will be transmitted to a mobile device 116, to resource elements associated with the PDSCH to facilitate transmission of the DBCH to the mobile device 116.

Processor 1612 can be coupled to a data store 714 that can store information, such as data, system parameter information (e.g., guard time parameter, DL subframe parameter), rate matching information, mapping information, signal strength information, identification information, neighbor cell lists, and/or other information, related to a base station 102, information related to the mobile device 116, and/or information otherwise related to communication in the wireless communication environment. Data store 714 can additionally store protocols and/or algorithms associated with and facilitating communicating with a mobile device 116, another base station, cells, or another communication device; transmitting a guard time parameter via the PBCH or DBCH to a mobile device 116; transmitting a DL subframe parameter to a mobile device 116; determining a proper rate matching to employed when rate matching data; rate matching of data to be transmitted to a mobile device 116; and/or other functions associated with the base station 102.

It is to be appreciated and understood that the message generator 702, system parameter indicator 704, encoder 706, evaluator 708, rate matcher 710, mapper 712, and data store 714 each can be the same or similar as, and/or can comprise the same or similar functionality as, respective components, such as more fully described herein, for example, with regard to system 700. It is to be further appreciated and understood that the message generator 702, system parameter indicator 704, encoder 706, evaluator 708, rate matcher 710, mapper 712, and data store 714, each can be a stand-alone unit (as depicted), can be included within the processor 1612, can be incorporated within another component, and/or virtually any suitable combination thereof, as desired.

Figure 17:
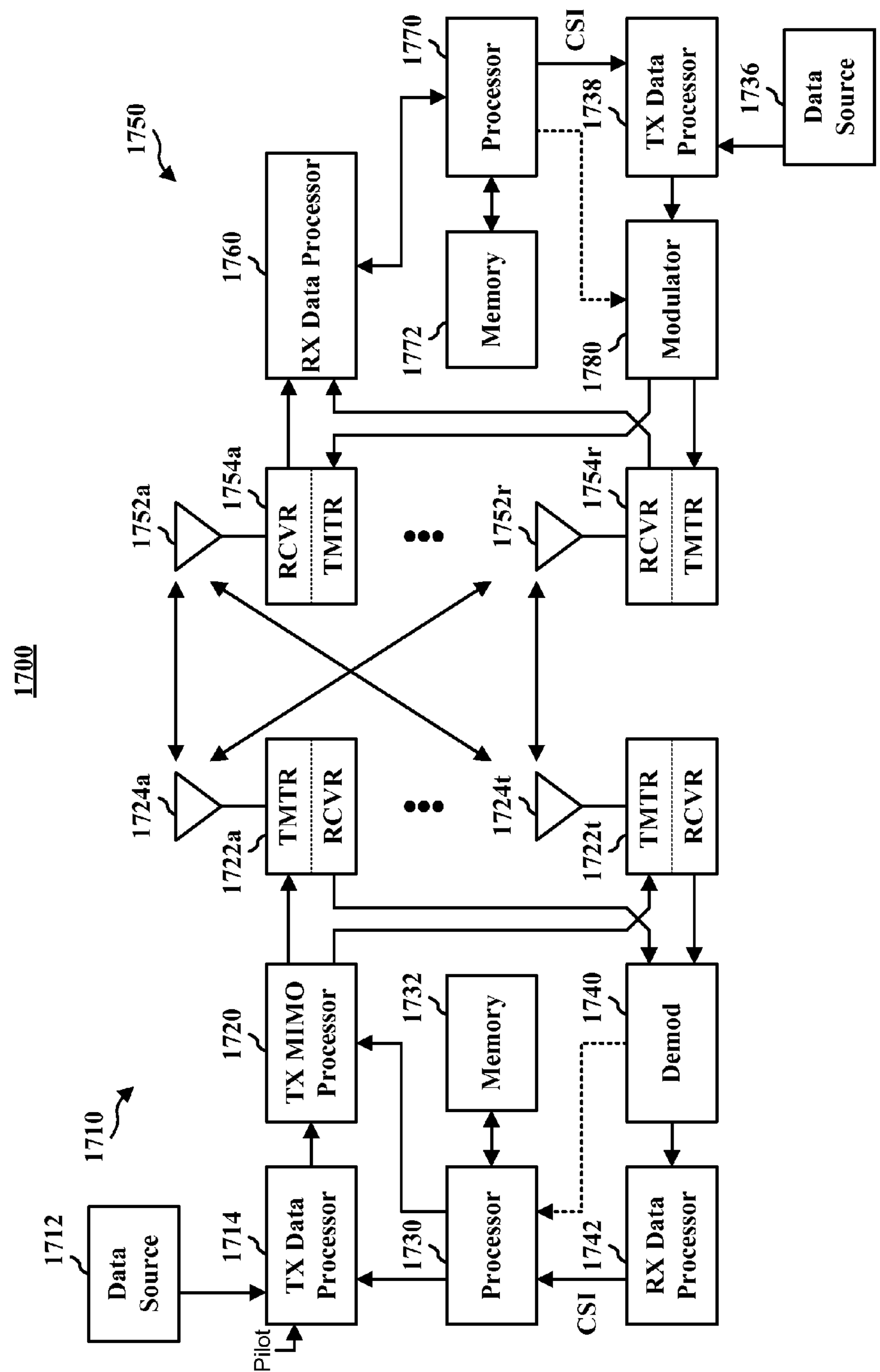
FIG. 17 is an illustration of an example wireless network system that can be employed in conjunction with the various systems and methods described herein.

FIG. 17 shows an example wireless communication system 1700 in accordance with an aspect of the disclosed subject matter. The wireless communication system 1700 depicts one base station 1710 and one mobile device 1750 for sake of brevity. However, it is to be appreciated that system 1700 can include more than one base station and/or more than one mobile device, wherein additional base stations and/or mobile devices can be substantially similar or different from example base station 1710 and mobile device 1750 described below. In addition, it is to be appreciated that base station 1710 and/or mobile device 1750 can employ the systems (FIGS. 1, 6, 7, 15, 16) and/or methods (FIGS. 8-14) described herein to facilitate wireless communication there between. It is to be appreciated that base station 1710 and mobile device 1750 each can be respectively the same or similar as, and/or can comprise respectively the same or similar functionality as, respective components as more fully described herein, such as, for example, with regard to system 100, system 600, system 700, system 1500, system 1600, methodology 800, methodology 900, methodology 1000, methodology 1100, methodology 1200, methodology 1300, and methodology 1400.

At base station 1710, traffic data for a number of data streams is provided from a data source 1712 to a transmit (TX) data processor 1714. According to an example, each data stream can be transmitted over a respective antenna. TX data processor 1714 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 1750 to estimate channel response. The multiplexed pilot and coded data for each data stream can be modulated (e.g. symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1730.

The modulation symbols for the data streams can be provided to a TX MIMO processor 1720, which can further process the modulation symbols (e.g., for OFDM). TX MIMO processor 1720 then provides $N_T$ modulation symbol streams to $N_T$ transmitters (TMTR) 1722*a* through 1722*t*. In various embodiments, TX MIMO processor 1720 applies beamforming weights to the symbols of the data streams and to the antenna from which the symbol is being transmitted.

Each transmitter 1722 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1722*a* through 1722*t* are transmitted from $N_T$ antennas 1724*a* through 1724*t*, respectively.

At mobile device 1750, the transmitted modulated signals are received by $N_R$ antennas 1752*a* through 1752*r* and the received signal from each antenna 1752 is provided to a respective receiver (RCVR) 1754*a* through 1754*r*. Each receiver 1754 conditions (e.g., filters, amplifies, and downconverts) a respective signal, digitizes the conditioned signal to provide samples, and further processes the samples to provide a corresponding "received" symbol stream.

An RX data processor 1760 can receive and process the $N_R$ received symbol streams from $N_R$ receivers 1754 based on a particular receiver processing technique to provide $N_T$ "detected" symbol streams. RX data processor 1760 can demodulate, deinterleave, and decode each detected symbol stream to recover the traffic data for the data stream. The processing by RX data processor 1760 is complementary to that performed by TX MIMO processor 1720 and TX data processor 1714 at base station 1710.

A processor 1770 can periodically determine which precoding matrix to use (discussed below). Further, processor 1770 can formulate a reverse link message comprising a matrix index portion and a rank value portion.

The reverse link message can comprise various types of information regarding the communication link and/or the received data stream. The reverse link message can be processed by a TX data processor 1738, which also receives traffic data for a number of data streams from a data source 1736, modulated by a modulator 1780, conditioned by transmitters 1754*a* through 1754*r*, and transmitted back to base station 1710.

At base station 1710, the modulated signals from mobile device 1750 are received by antennas 1724, conditioned by receivers 1722, demodulated by a demodulator 1740, and processed by a RX data processor 1742 to extract the reverse link message transmitted by mobile device 1750. Further, processor 1730 can process the extracted message and can determine which precoding matrix to use for determining the beamforming weights.

Processors 1730 and 1770 can direct (e.g., control, coordinate, manage, etc.) operation at base station 1710 and mobile device 1750, respectively. Respective processors 1730 and 1770 can be associated with memory 1732 and 1772 that store program codes and data. Processors 1730 and 1770 can also perform computations to derive frequency and impulse response estimates for the UL and downlink, respectively.

In an aspect, logical channels are classified into Control Channels and Traffic Channels. Logical Control Channels comprises Broadcast Control Channel (BCCH) which is DL channel for broadcasting system control information. Paging Control Channel (PCCH) which is DL channel that transfers paging information. Multicast Control Channel (MCCH) which is Point-to-multipoint DL channel used for transmitting Multimedia Broadcast and Multicast Service (MBMS) scheduling and control information for one or several MTCHs. Generally, after establishing RRC connection this channel is only used by UEs that receive MBMS (Note: old MCCH+MSCH). Dedicated Control Channel (DCCH) is Point-to-point bidirectional channel that transmits dedicated control information and used by UEs having an RRC connection. In an aspect, Logical Traffic Channels comprises a Dedicated Traffic Channel (DTCH) which is Point-to-point bidirectional channel, dedicated to one UE, for the transfer of user information. Also, a Multicast Traffic Channel (MTCH) for Point-to-multipoint DL channel for transmitting traffic data.

In an aspect, Transport Channels are classified into DL and UL. DL Transport Channels comprises a Broadcast Channel (BCH), Downlink Shared Data Channel (DL-SDCH) and a Paging Channel (PCH), the PCH for support of UE power saving (DRX cycle is indicated by the network to the UE), broadcasted over entire cell and mapped to PHY resources which can be used for other control/traffic channels. The UL Transport Channels comprises a Random Access Channel (RACH), a Request Channel (REQCH), an Uplink Shared Data Channel (UL-SDCH) and plurality of PHY channels. The PHY channels comprise a set of DL channels and UL channels.

The DL PHY channels can comprise: Common Pilot Channel (CPICH), Synchronization Channel (SCH), Common Control Channel (CCCH), Shared DL Control Channel (SDCCH), Multicast Control Channel (MCCH), Shared UL Assignment Channel (SUACH), Acknowledgement Channel (ACKCH), DL Physical Shared Data Channel (DL-PSDCH), UL Power Control Channel (UPCCH), Paging Indicator Channel (PICH), Load Indicator Channel (LICH).

The UL PHY Channels can comprise: Physical Random Access Channel (PRACH), Channel Quality Indicator Channel (CQICH), Acknowledgement Channel (ACKCH), Antenna Subset Indicator Channel (ASICH), Shared Request Channel (SREQCH), UL Physical Shared Data Channel (UL-PSDCH), Broadband Pilot Channel (BPICH).

In an aspect, a channel structure is provided that preserves low PAR (at any given time, the channel is contiguous or uniformly spaced in frequency) properties of a single carrier waveform.

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 18:
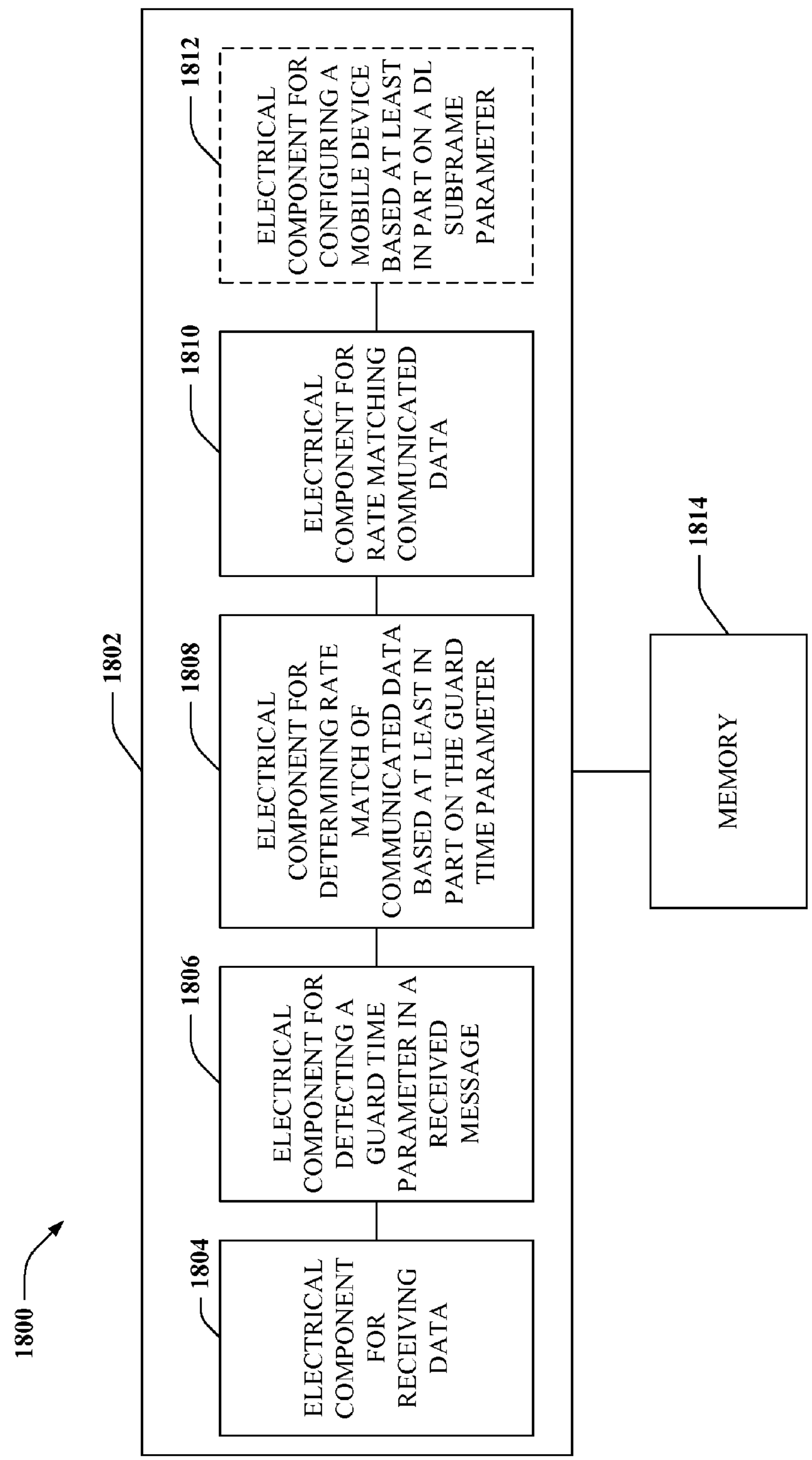
FIG. 18 is a depiction of an example system that can facilitate communication associated with a mobile device in a wireless communication environment.

With reference to FIG. 18, illustrated is a system 1800 that can facilitate communication associated with a mobile device in a wireless communication environment. For example, system 1800 can reside at least partially within a mobile device (e.g., 116). It is to be appreciated that system 1800 is represented as including functional blocks, which can be functional blocks that represent functions implemented by a processor, software, or combination thereof (e.g., firmware). System 1800 includes a logical grouping 1802 of electrical components that can act in conjunction.

For instance, logical grouping 1802 can include an electrical component for receiving data 1804. In one aspect, the electrical component for receiving data 1804 can receive messages comprising data, including, for example, system parameter information, scheduled data, and/or other data, from the base station 102 and/or via the base station from other communication devices (e.g., mobile device 122). The system parameter information can include a guard time parameter associated with the DL subframe. The system parameter information can be communicated via the PBCH or PDSCH.

Further, logical grouping 1802 can comprise an electrical component for detecting a guard time parameter in a received message 1806. In one aspect, the electrical component 1806 can detect and/or identify a guard time parameter associated with the DL subframe, where the guard time parameter can be included in a system parameter message communicated from the base station 102 to the mobile device 116. In accordance with various embodiments, the guard time parameter can be communicated via the PBCH or PDSCH to the mobile device

116. When the guard time parameter is communicated via the PDSCH, the guard time parameter can be included in the DBCH, which can include at least a portion of the system parameters associated with the communication system. The mobile device 116 can decode the received data to facilitate identifying the guard time parameter of the DL subframe associated with the communication system.

Logical grouping 1802 also can include an electrical component for determining a desired rate match based at least in part on the guard time parameter 1808. In one aspect, the electrical component 1808 can facilitate determining a proper rate match to apply to received information, including at least a portion of the information (e.g., system parameters) received via the PDSCH from the base station 102.

Logical grouping 1802 also can include an electrical component for rate matching communicated data 1810. In one aspect, the electrical component for 1810 can rate match data, including received data, based at least in part on the determined rate match parameter to facilitate reducing or minimizing inefficient erasure or elimination of received information. The base station 102 can rate match data, such as data (e.g., DBCH) transmitted via the PBCH or PDSCH from the base station 102 to the mobile device 116. When the mobile device 116 has identified the guard time parameter and determined the proper rate match, the electrical component 1810 can rate match at least a portion of the information received via the PDSCH as well as other information.

Logical grouping 1802 optionally can include an electrical component for configuring a mobile device based at least in part on a DL subframe parameter 1812. In one aspect, the electrical component 1812 can facilitate configuring the mobile device 116, based at least in part on a received DL subframe parameter, so the mobile device 116 can operate in accordance with a specified radio frame sequence (e.g., a radio frame sequence where the subframe immediately after a subframe containing DBCH is a DL subframe). Additionally, system 1800 can include a memory 1814 that can retain instructions for executing functions associated with electrical components 1804, 1806, 1808, 1810, and 1812. While shown as being external to memory 1814, it is to be understood that one or more of electrical components 1804, 1806, 1808, 1810, and 1812 can exist within memory 1814.

Figure 19:
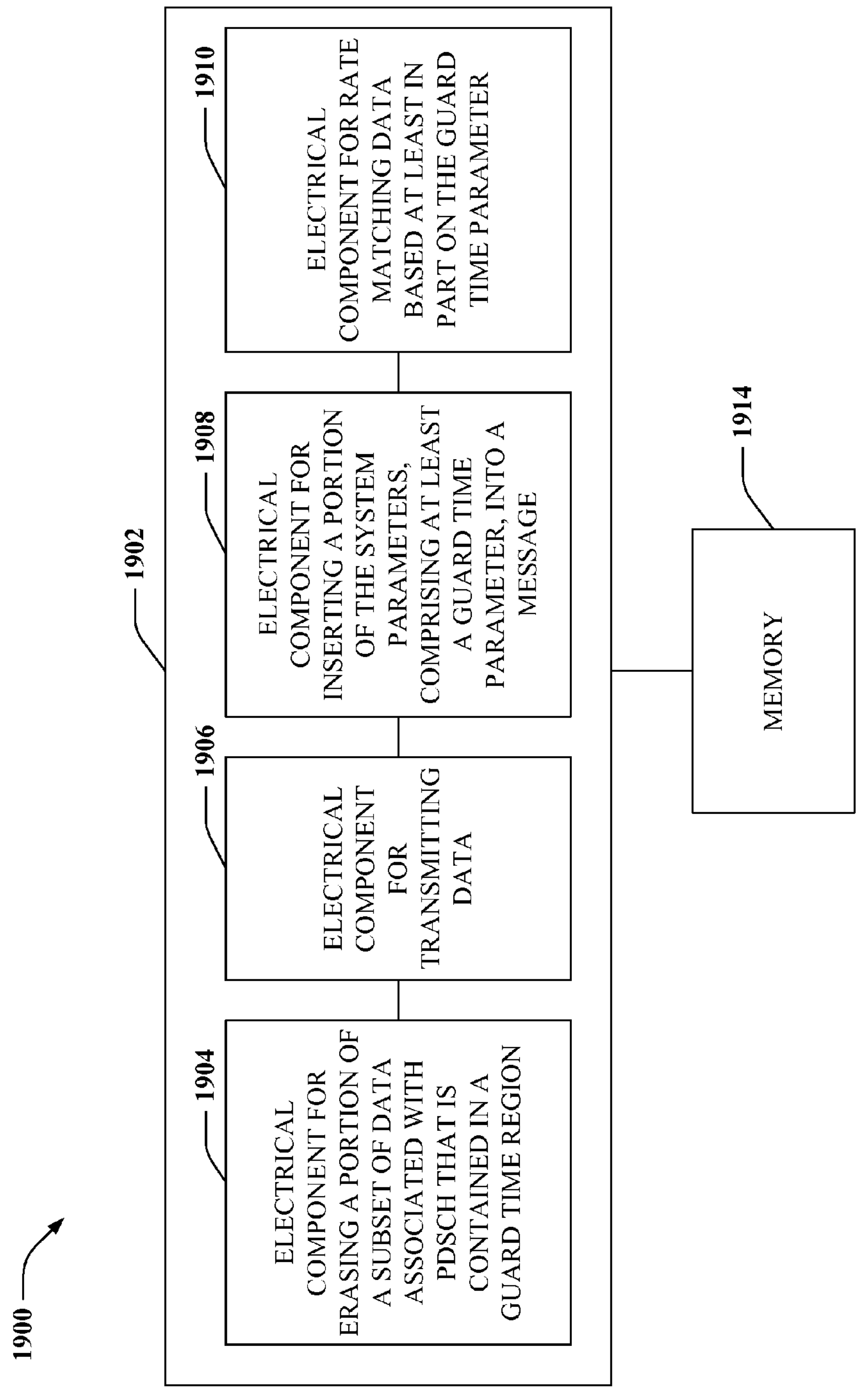
FIG. 19 is an illustration of another example system that can facilitate communication associated with a mobile device in a wireless communication environment.

Turning to FIG. 19, illustrated is a system 1900 that can facilitate communication associated with a mobile device in a wireless communication environment. For example, system 1900 can reside at least partially within a base station 102 that can be associated (e.g., wirelessly connected) with a mobile device (e.g., 116). It is to be appreciated that system 1900 is represented as including functional blocks, which can be functional blocks that represent functions implemented by a processor, software, or combination thereof (e.g., firmware). System 1900 includes a logical grouping 1902 of electrical components that can act in conjunction.

In one aspect, logical grouping 1902 can include an electrical component for erasing a portion of a subset of data associated with a physical downlink shared channel that is contained in a guard time region 1904. The electrical component 1904 can erase data that occupies a guard time region 309, for example, when the base station 102 is broadcasting data (e.g., via PDSCH) to mobile devices (e.g., 116) and the mobile devices do not know the guard time. A mobile device may not know the guard time, for instance, when the mobile device is attempting to acquire the base station 102. The base station 102 can broadcast a guard time parameter related to the duration of the guard time interval (e.g., guard time region 309) to the mobile devices (e.g., 116) associated with the base station 102. Once a mobile device discovers the guard time, the base station 102 can rate match data around the guard time region 309 when transmitting data (e.g., PDSCH) to the mobile device and will not have to erase data, since the data will not occupy the guard time region 309. After receiving the guard time parameter, the mobile device 116 can rate match data received from the base station 102, based at least in part on the guard time parameter.

In another aspect, logical grouping 1902 can include an electrical component for transmitting data 1906. In one aspect, the electrical component for transmitting data 1906 can transmit data (e.g., a subset of data), such as, for example, system parameter information, scheduled data, user data, and/or other data, from the base station 102 to a desired mobile device(s) 116. In an aspect, the system parameter information can comprise a guard time parameter associated with the DL subframe to facilitate rate matching of data communicated between the base station 102 and mobile device 116. In accordance with one embodiment, the system parameter information can comprise a DL subframe parameter that can be transmitted to the mobile device 116 to facilitate configuring the mobile device 116 to operate in accordance with a specified radio frame sequence (e.g., a radio frame sequence where the subframe immediately after a subframe containing DBCH is a DL subframe) associated with the communication system.

Further, logical grouping 1902 can comprise an electrical component for inserting a portion of the system parameters, comprising at least the guard time parameter, into a message (e.g., system parameter message) 1908. In one aspect, the electrical component 1908 can insert one or more system parameters, including the guard time parameter, into a system parameter message. In accordance with various embodiments, the guard time parameter can be transmitted with other system parameters via the PBCH or the DBCH, where the DBCH can be mapped to the PDSCH and can be transmitted via the PDSCH to the mobile device 116. In accordance with an embodiment, the electrical component 1908 can insert one or more system parameters, comprising a DL subframe parameter, into a message that can be contained in the DBCH, and transmitted via the PDSCH, comprising the DBCH, to the mobile device 116.

Logical grouping 1902 also can include an electrical component for rate matching data based at least in part on the guard time parameter 1910. In one aspect, the electrical component 1910 can rate match data, such as data (e.g., DBCH; other information associated with the PDSCH) communicated via the PDSCH, based at least in part on the guard time parameter. For example, the electrical component 1910 can rate match data so that the base station 102 can refrain from occupying during the guard time interval where data can be rate matched around the unoccupied symbols associated with the guard time interval. Additionally, system 1900 can include a memory 1912 that retains instructions for executing functions associated with electrical components 1904, 1906, 1908, and 1910. While shown as being external to memory 1912, it is to be understood that one or more of electrical components 1904, 1906, 1908, and 1910 can exist within memory 1912.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method that facilitates communication associated with a mobile device, comprising:

erasing a portion of a first subset of data associated with a physical downlink shared channel that is contained in a guard time region to obtain a second subset of data having unoccupied symbols within the guard time region; and transmitting the second subset of data, comprising a portion of system parameters including a guard time parameter, to a plurality of mobile devices, including the mobile device, wherein the guard time parameter is based at least in part on the guard time region and facilitates rate matching of data by the mobile device, and wherein the second subset of data further comprises a downlink subframe parameter that identifies a configuration of a radio frame sequence to facilitate configuring the mobile device to operate in accordance with the radio frame sequence, the downlink subframe parameter specifies that a subframe immediately following a subframe containing a dynamic broadcast channel is designated as a downlink subframe.

2. The method of claim 1, further comprising:

rate matching at least one other subset of data based at least in part on the guard time parameter; and transmitting the at least one other subset of data to the mobile device.

3. The method of claim 1, wherein the guard time parameter is transmitted via a primary broadcast channel.

4. The method of claim 1, wherein the guard time parameter is transmitted via the physical downlink shared channel.

5. The method of claim 1, further comprising:

rate matching a subset of code blocks, associated with at least one transport channel, around the guard time region, associated with a downlink subframe of a radio frame sequence, on a per code block basis based at least in part on the guard time parameter in order to facilitate reducing or minimizing data loss by any particular code block or particular portion of the code blocks so that data loss, if any, is incurred substantially equally by each of the code blocks;

concatenating the code blocks to interlace the code blocks; and transmitting the code blocks to the mobile device via the at least one transport channel.

6. A wireless communications apparatus, comprising:

a memory that retains instructions related to:

erasing a portion of a first subset of data associated with a physical downlink shared channel that is contained in a guard time region to obtain a second subset of data having unoccupied symbols in the guard time region, transmitting the second subset of data, comprising a portion of system parameters including a guard time parameter, via one of a primary broadcast channel or dynamic broadcast channel, wherein the guard time parameter is based at least in part on the guard time region and facilitates rate matching of data by the mobile device, and transmitting data comprising a downlink subframe parameter related to a radio frame sequence via the dynamic broadcast channel to facilitate configuration of the mobile device to operate using the radio frame sequence structured such that a subframe immediately following a subframe containing a dynamic broadcast channel is designated as a downlink subframe; and a processor, coupled to the memory, configured to execute the instructions retained in the memory.

7. The wireless communications apparatus of claim 6, wherein the memory further retains instructions related to:

rate matching at least one other subset of data based at least in part on the guard time parameter; and transmitting the at least one other subset of data to the mobile device.

8. A wireless communications apparatus that facilitates communication associated with a mobile device, comprising:

means for erasing a portion of a first subset of data associated with a physical downlink shared channel that is contained in a guard time region to obtain a second subset of data having unoccupied symbols in the guard time region;

means for transmitting the second subset of data, comprising a portion of system parameters including the guard time parameter, wherein the guard time parameter relates to the guard time region and facilitates rate matching of data by the mobile device; and means for transmitting at least one system parameter, comprising a downlink subframe parameter related to the radio frame sequence, via a dynamic broadcast channel to facilitate configuration of the mobile device, based at least in part on the downlink subframe parameter, to facilitate enabling the mobile device to operate in accordance with the radio frame sequence, wherein the radio frame sequence is configured such that a downlink subframe immediately follows a subframe comprising a dynamic broadcast channel.

9. The wireless communications apparatus of claim 8, further comprising:

means for rate matching at least one other subset of data around a guard time region associated with a downlink subframe of a radio frame sequence; and means for transmitting the at least one other subset of data to the mobile device.

10. A computer program product, comprising:

a non-transitory computer-readable medium comprising code for:

erasing a portion of a first subset of data associated with a physical downlink shared channel that is contained in a guard time region to obtain a second subset of data having unoccupied symbols in the guard time region;

transmitting the second subset of data, comprising a portion of system parameters including a guard time parameter, wherein the guard time parameter is based at least in part on the guard time region and facilitates rate matching of data by the mobile device; and transmitting at least one system parameter, comprising a downlink subframe parameter related to the radio frame sequence, via a dynamic broadcast channel to facilitate configuration of the mobile device, based at least in part on the downlink subframe parameter, to facilitate enabling the mobile device to operate in accordance with the radio frame sequence, wherein the radio frame sequence is configured such that a downlink subframe immediately follows a subframe comprising a dynamic broadcast channel.

11. The computer program product of claim 10, wherein the non-transitory computer-readable medium further comprises code for:

rate matching at least one other subset of data based at least in part on the guard time parameter; and transmitting the at least one other subset of data to the mobile device.

12. In a wireless communications system, an apparatus comprising:

a processor configured to:

erase a portion of a first subset of data associated with a physical downlink shared channel that is contained in a guard time region to obtain a second subset of data having unoccupied symbols in the guard time region;

transmit the second subset of data, comprising a portion of system parameters including a guard time parameter, wherein the guard time parameter is based at least in part on the guard time region and facilitates rate matching of data by the mobile device; and transmit at least one system parameter, comprising a downlink subframe parameter related to the radio frame sequence, via a dynamic broadcast channel to facilitate configuration of the mobile device, based at least in part on the downlink subframe parameter, to facilitate enabling the mobile device to operate in accordance with the radio frame sequence, wherein the radio frame sequence is configured such that a downlink subframe immediately follows a subframe comprising a dynamic broadcast channel.

13. The apparatus of claim 12, wherein the processor is further configured to:

rate match at least one other subset of data based at least in part on the guard time parameter; and transmit the at least one other subset of data to the mobile device.

14. The apparatus of claim 12, wherein the guard time parameter is transmitted via one of a primary broadcast channel or a dynamic broadcast channel.

15. A method that facilitates communication associated with a mobile device, comprising:

receiving data comprising a guard time parameter related to a guard time region comprising unoccupied symbols within a downlink subframe of a radio frame sequence; and at least one of:

structuring the mobile device such that the mobile device operates in accordance with the radio frame sequence; or receiving data comprising a downlink subframe parameter related to the configuration of the radio frame sequence, wherein the downlink subframe parameter is received via the dynamic broadcast channel, identifying the downlink subframe parameter, and configuring the mobile device based at least in part on the downlink subframe parameter so that the mobile device operates in accordance with the radio frame sequence; and rate matching at least a portion of the received data based at least in part on the guard time parameter to facilitate improved reception of a physical downlink shared channel.

16. The method of claim 15, the receiving data, further comprising:

receiving data, comprising at least a portion of system parameters, including the guard time parameter, via a primary broadcast channel;

identifying the guard time parameter in the received data; and determining a rate match based at least in part on the guard time parameter.

17. The method of claim 16, further comprising:

receiving another portion of data, comprising at least another portion of system parameters and other information, via the physical downlink shared channel, comprising a dynamic broadcast channel, wherein the dynamic broadcast channel is mapped to the physical downlink shared channel, at least a subset of the at least another portion of data is rate matched around unoccupied symbols associated with the guard time region.

18. The method of claim 15, the receiving data, further comprising:

receiving data, including at least a portion of system parameters, comprising the guard time parameter, and other information, via the physical downlink shared channel, wherein the physical downlink shared channel contains a dynamic broadcast channel that includes the guard time parameter;

identifying the guard time parameter in the received data; and determining a rate match based at least in part on the guard time parameter.

19. The method of claim 18, further comprising:

rate matching at least a portion of the data, received via the physical downlink shared channel, around unoccupied symbols associated with the guard time region based at least in part on the determined rate match to facilitate improved reception of the physical downlink shared channel.

20. The method of claim 15, wherein the received data is rate matched by a base station communicatively connected with the mobile device prior to transmission of the data to the mobile device.

21. The method of claim 15, further comprising:

receiving a subset of code blocks via at least one transport channel, comprising at least one of a downlink shared channel (DL-SCH), a paging channel (PCH), or a multicast channel (MCH), wherein the code blocks are concatenated;

rate matching the subset of code blocks around the guard time region on a per code block basis, based at least in part on the guard time parameter, to facilitate reducing or minimizing data loss by any particular code block or particular portion of the code blocks so that data loss, if any, is sustained substantially equally by each of the code blocks.

22. A wireless communications apparatus, comprising:

a memory that retains instructions related to:

receiving data comprising a guard time parameter related to a guard time region comprising unoccupied symbols within a downlink subframe of a radio frame sequence, at least one of:

configuring the mobile device such that the mobile device operates in accordance with the radio frame sequence, or receiving data comprising a downlink subframe parameter related to the configuration of the radio frame sequence via a dynamic broadcast channel, retrieving the downlink subframe parameter, and configuring the mobile device based at least in part on the downlink subframe parameter so that the mobile device operates in accordance with the radio frame sequence, and rate matching of at least a portion of the received data based at least in part on the guard time parameter to facilitate improved reception of a physical downlink shared channel; and a processor, coupled to the memory, configured to execute the instructions retained in the memory.

23. The wireless communications apparatus of claim 22, wherein the memory further retains instructions related to:

receiving data, comprising at least a portion of system parameters, including the guard time parameter, via a primary broadcast channel;

retrieving the guard time parameter from the received data; and determining a rate match based at least in part on the guard time parameter.

24. The wireless communications apparatus of claim 23, wherein the memory further retains instructions related to:

receiving another portion of data, comprising at least another portion of system parameters and other information, via the physical downlink shared channel, comprising a dynamic broadcast channel, wherein the dynamic broadcast channel is mapped to the physical downlink shared channel; and rate matching at least a subset of the at least another portion of data around unoccupied symbols associated with the guard time region.

25. The wireless communications apparatus of claim 22, wherein the memory further retains instructions related to:

receiving data, including at least a portion of system parameters, comprising the guard time parameter, and other information, via the physical downlink shared channel, wherein the physical downlink shared channel contains a dynamic broadcast channel that includes the guard time parameter, wherein the data is rate matched by a base station associated with the mobile device prior to transmission of the data to the mobile device;

retrieving the guard time parameter in the received data;

determining a rate match based at least in part on the guard time parameter; and rate matching at least a portion of the data, received via the physical downlink shared channel, around unoccupied symbols associated with the guard time region, wherein the rate match is performed by the mobile device.

26. A wireless communications apparatus that facilitates communication associated with a mobile device, comprising:

means for receiving data, comprising a guard time parameter related to a guard time region comprising unoccupied symbols within a downlink subframe of a radio frame sequence, via at least one of a primary broadcast channel or a dynamic broadcast channel;

at least one of:

means for structuring the mobile device such that the mobile device operates in accordance with the radio frame sequence; or means for receiving data comprising a downlink subframe parameter related to the configuration of the radio frame sequence, wherein the downlink subframe parameter is received via the dynamic broadcast channel, means for identifying the downlink subframe parameter, and means for configuring the mobile device based at least in part on the downlink subframe parameter so that the mobile device operates in accordance with the radio frame sequence; and means for rate matching at least a portion of the received data based at least in part on the guard time parameter to facilitate improved reception of a physical downlink shared channel.

27. The wireless communications apparatus of claim 26, further comprising:

means for identifying the guard time parameter in the received data;

means for determining a rate match based at least in part on the guard time parameter; and means for rate matching at least a portion of data received via a physical downlink shared channel, around unoccupied symbols associated with the guard time region.

28. A computer program product, comprising:

a non-transitory computer-readable medium comprising code for:

receiving data comprising a guard time parameter related to a guard time region comprising unoccupied symbols within a downlink subframe of a radio frame sequence; and at least one of:

structuring the mobile device such that the mobile device operates in accordance with the radio frame sequence; or receiving data comprising a downlink subframe parameter related to the configuration of the radio frame sequence, wherein the downlink subframe parameter is received via the dynamic broadcast channel, identifying the downlink subframe parameter, and configuring the mobile device based at least in part on the downlink subframe parameter so that the mobile device operates in accordance with the radio frame sequence; and rate matching at least a portion of the received data around the guard time region based at least in part on the guard time parameter to facilitate improved reception of a physical downlink shared channel.

29. The computer program product of claim 28, wherein the non-transitory computer-readable medium further comprises code for:

receiving data, comprising at least a portion of system parameters, including the guard time parameter, via a primary broadcast channel;

identifying the guard time parameter in the received data; and determining a rate match based at least in part on the guard time parameter.

30. The computer program product of claim 29, wherein the non-transitory computer-readable medium further comprises code for:

receiving another portion of data, comprising at least another portion of system parameters and other information, via the physical downlink shared channel, comprising a dynamic broadcast channel, wherein the dynamic broadcast channel is mapped to the physical downlink shared channel; and rate matching at least a subset of the at least another portion of data around unoccupied symbols associated with the guard time region.

31. The computer program product of claim 28, wherein the non-transitory computer-readable medium further comprises code for:

receiving data, including at least a portion of system parameters, comprising the guard time parameter, and other information, via the physical downlink shared channel, wherein the physical downlink shared channel contains a dynamic broadcast channel that includes the guard time parameter;

identifying the guard time parameter in the received data;

determining a rate match based at least in part on the guard time parameter; and rate matching at least a portion of the data, received via the physical downlink shared channel, around unoccupied symbols associated with the guard time region.

32. In a wireless communications system, an apparatus comprising:

a processor configured to:

receive data, comprising a guard time parameter related to a guard time region comprising unoccupied symbols within a downlink subframe of a radio frame sequence, via at least one of a primary broadcast channel or a dynamic broadcast channel; and at least one of:

configure the mobile device such that the mobile device operates in accordance with the radio frame sequence, or receive data comprising a downlink subframe parameter related to the configuration of the radio frame sequence via a dynamic broadcast channel, retrieve the downlink subframe parameter, and configure the mobile device based at least in part on the downlink subframe parameter so that the mobile device operates in accordance with the radio frame sequence; and rate match at least a portion of the received data based at least in part on the guard time parameter to facilitate improved reception of a physical downlink shared channel.

* * * * *